US012613301B2

(12) United States Patent
Ashour et al.

(10) Patent No.: US 12,613,301 B2
(45) Date of Patent: Apr. 28, 2026

(54) RF MAP CONSTRUCTION VIA AGGREGATION OF MULTIPLE SENSING UE REPORTS

(71) Applicant: QUALCOMM Incorporated, San Diego, CA (US)

(72) Inventors: Mahmoud Ashour, San Diego, CA (US); Kapil Gulati, Belle Mead, NJ (US); Himaja Kesavareddigari, Bridgewater, NJ (US); Kyle Chi Guan, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 18/240,732

(22) Filed: Aug. 31, 2023

(65) Prior Publication Data

US 2025/0076445 A1     Mar. 6, 2025

(51) Int. Cl.
*G01S 5/02*     (2010.01)
*G01S 5/00*     (2006.01)

(52) U.S. Cl.
CPC ........ *G01S 5/02526* (2020.05); *G01S 5/0036* (2013.01)

(58) Field of Classification Search
CPC .......................... G01S 5/02526; G01S 5/0036
USPC ....................................................... 342/451
See application file for complete search history.

(56) References Cited

U.S. PATENT DOCUMENTS

| | | | | |
|---|---|---|---|---|
| 12,388,512 B2 * | 8/2025 | Miao | ...................... | H04W 52/36 |
| 2023/0146887 A1 | 5/2023 | Metwaly Saad et al. | | |
| 2023/0208495 A1 * | 6/2023 | Cheema | ................ | G01S 5/0036 |
| | | | | 375/262 |

FOREIGN PATENT DOCUMENTS

| | | | | | |
|---|---|---|---|---|---|
| CN | 112823556 A | * | 5/2021 | ........... | H04W 72/51 |
| JP | 7323543 B2 | * | 8/2023 | ........... | H04W 16/28 |
| WO | WO-2020066103 A1 | * | 4/2020 | ........... | H04W 16/28 |
| WO | WO-2020119727 A1 | * | 6/2020 | ........... | G01S 5/0236 |

OTHER PUBLICATIONS

Apple: "On Sidelink Operation on FR2", 3GPP TSG RAN WG1 #113, R1-2305246, 3rd Generation Partnership Project, Mobile Competence Centre, 650, Route Des Lucioles, F-06921 Sophia-Antipolis Cedex, France, vol. RAN WG1, No. Incheon, Korea, May 22, 2023-May 26, 2023, 22 Pages, May 15, 2023, XP052310688, Proposal 15.

(Continued)

*Primary Examiner* — Harry K Liu
(74) *Attorney, Agent, or Firm* — QUALCOMM Incorporated

(57)     ABSTRACT
A method of wireless communication at a UE is described herein. The method includes transmitting a sensing report including (1) a first indication of at least one radio frequency (RF) measurement associated with at least one BPL and (2) a second indication of a representation of an environment of the UE. The method includes obtaining an RF map based on the transmitted sensing report, where the RF map is indicative of at least one surface in the environment of the UE that is associated with at least one suitable BPL. The method includes communicating based on the RF map.

30 Claims, 19 Drawing Sheets

(56) References Cited

OTHER PUBLICATIONS

Deutsche Telekom AG, et al., "Pseudo-CR on Editorial Modifications of FS Sensing", 3GPP TSG SA WG 1 Meeting #102, S1-231209, 3rd Generation Partnership Project, Mobile Competence Centre, 650, Route Des Lucioles, F-06921 Sophia-Antipolis Cedex, France vol. SA WG1, No. Berlin, DE, May 22, 2023-May 26, 2023, 46 Pages, May 12, 2023, XP052309648, Sections 5.11.3, 5.11.6, 5.26. 3.
International Search Report and Written Opinion—PCT/US2024/041428—ISA/EPO—Nov. 22, 2024.
Romero D., et al., "Radio Map Estimation: A Data-driven Approach to Spectrum Cartography", IEEE Signal Processing Magazine, IEEE, USA, vol. 39, No. 6, Nov. 1, 2022, pp. 53-72, XP011925326, pp. 69,71.

* cited by examiner

SSB Tx Beams 606
CSI-RS Tx Beams 608
L1 UE Rx Beams 610
L2 UE Rx Beams 612
L3 UE Rx Beams 614
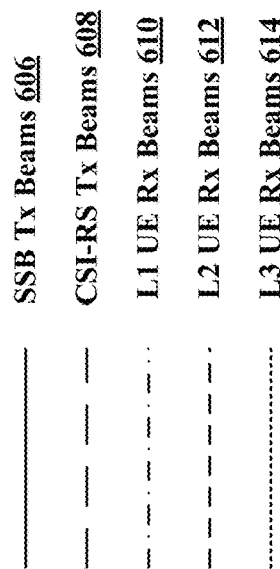
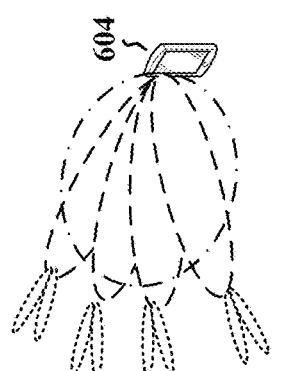
604
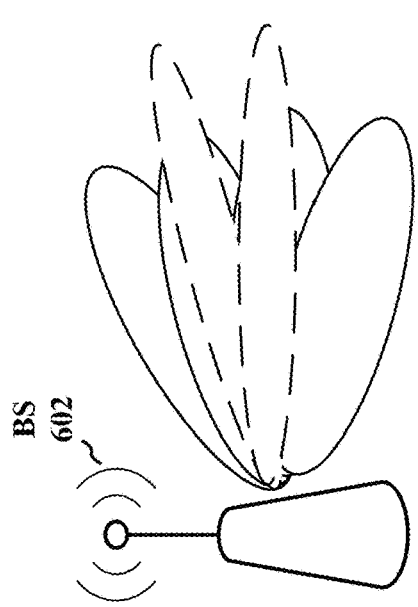
BS
602
600
FIG. 6

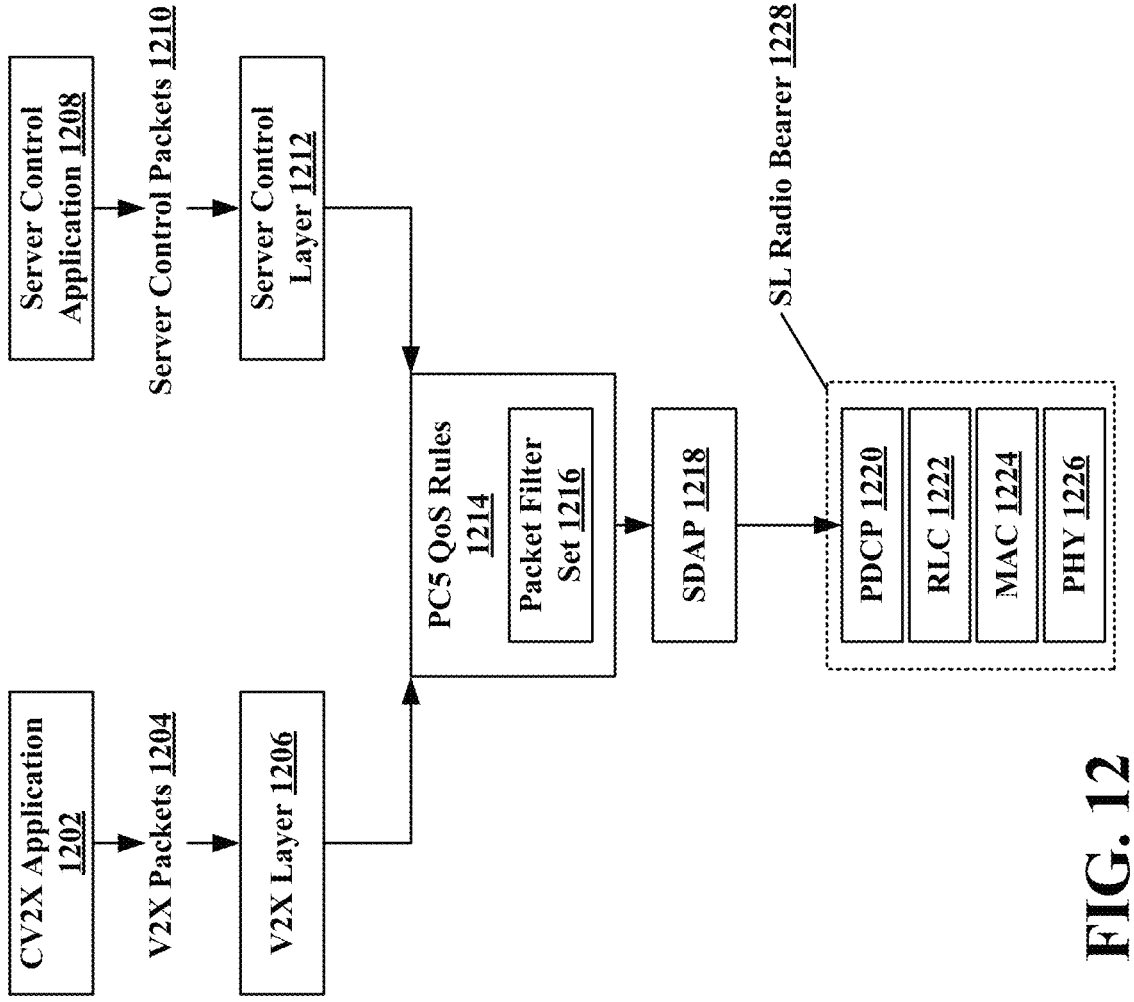
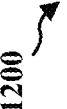
FIG. 12

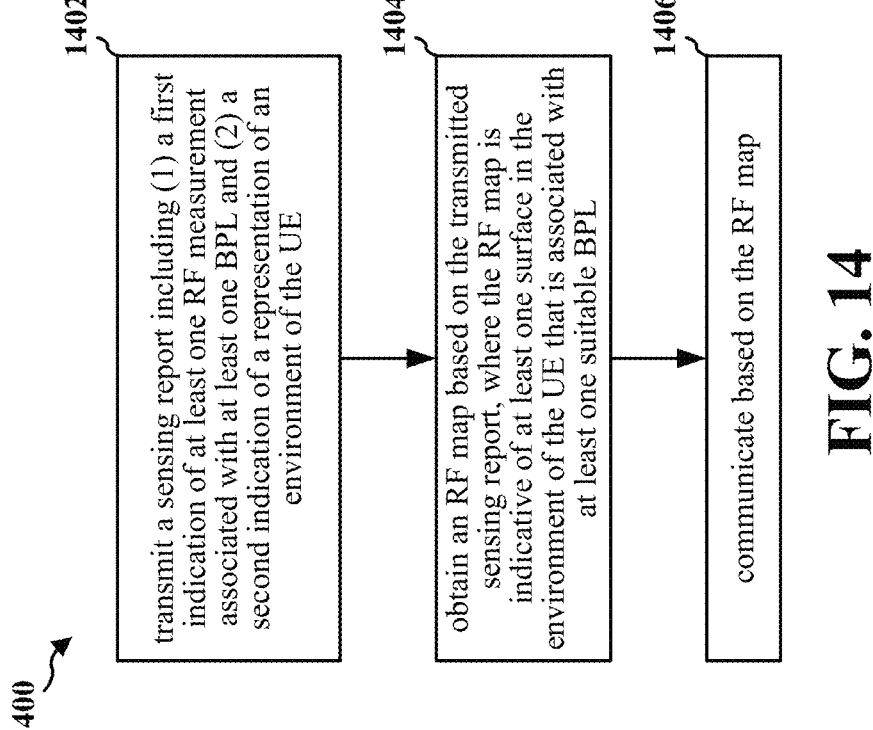

1402 transmit a sensing report including (1) a first indication of at least one RF measurement associated with at least one BPL and (2) a second indication of a representation of an environment of the UE

1404 obtain an RF map based on the transmitted sensing report, where the RF map is indicative of at least one surface in the environment of the UE that is associated with at least one suitable BPL

1406 communicate based on the RF map

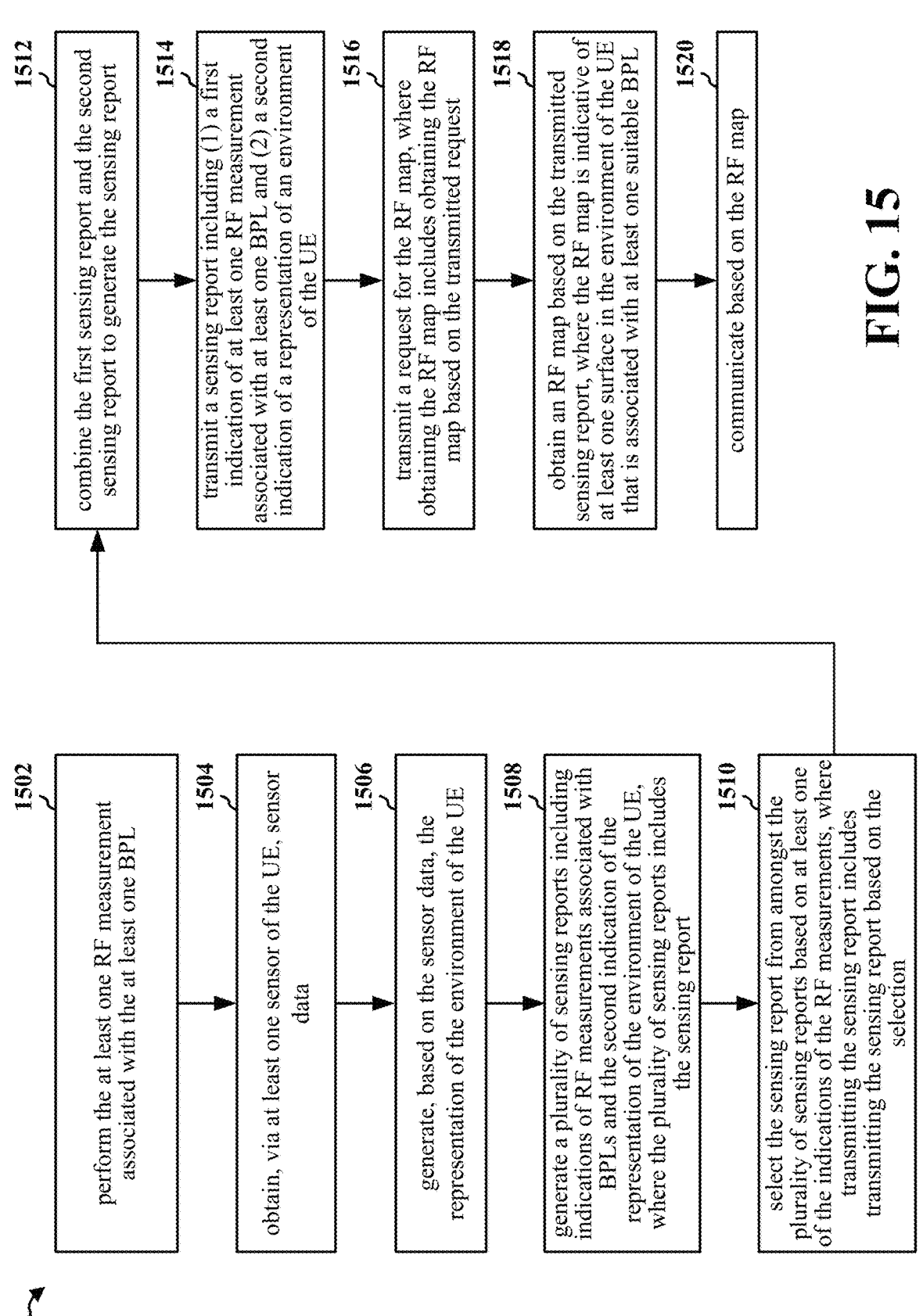

1502 perform the at least one RF measurement associated with the at least one BPL 1504 obtain, via at least one sensor of the UE, sensor data 1506 generate, based on the sensor data, the representation of the environment of the UE 1508 generate a plurality of sensing reports including indications of RF measurements associated with BPLs and the second indication of the representation of the environment of the UE, where the plurality of sensing reports includes the sensing report 1510 select the sensing report from amongst the plurality of sensing reports based on at least one of the indications of the RF measurements, where transmitting the sensing report includes transmitting the sensing report based on the selection 1512 combine the first sensing report and the second sensing report to generate the sensing report 1514 transmit a sensing report including (1) a first indication of at least one RF measurement associated with at least one BPL and (2) a second indication of a representation of an environment of the UE 1516 transmit a request for the RF map, where obtaining the RF map includes obtaining the RF map based on the transmitted request 1518 obtain an RF map based on the transmitted sensing report, where the RF map is indicative of at least one surface in the environment of the UE that is associated with at least one suitable BPL 1520 communicate based on the RF map

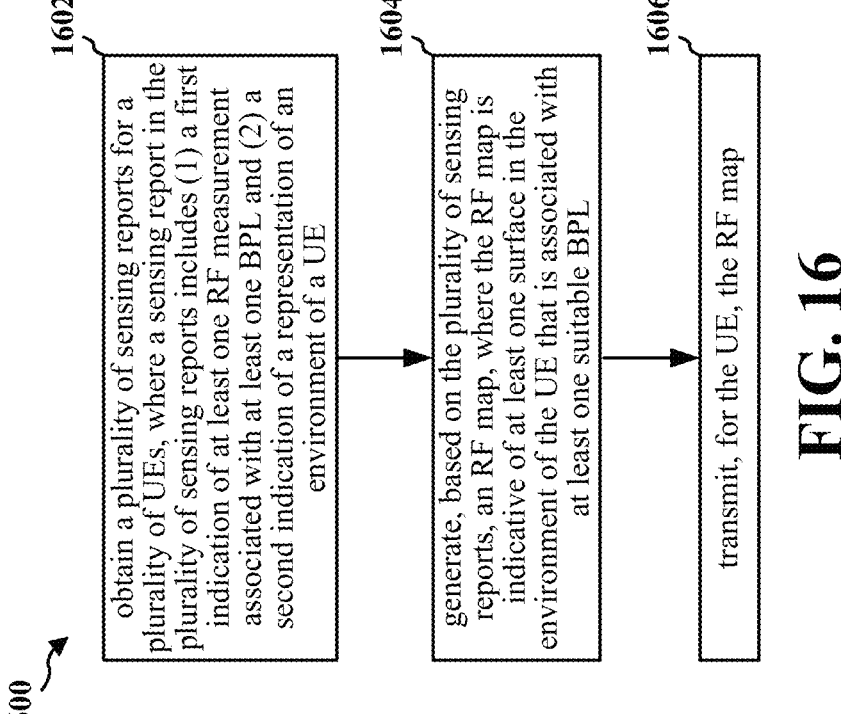

1600

1602 obtain a plurality of sensing reports for a plurality of UEs, where a sensing report in the plurality of sensing reports includes (1) a first indication of at least one RF measurement associated with at least one BPL and (2) a second indication of a representation of an environment of a UE

1604 generate, based on the plurality of sensing reports, an RF map, where the RF map is indicative of at least one surface in the environment of the UE that is associated with at least one suitable BPL

1606 transmit, for the UE, the RF map

FIG. 16

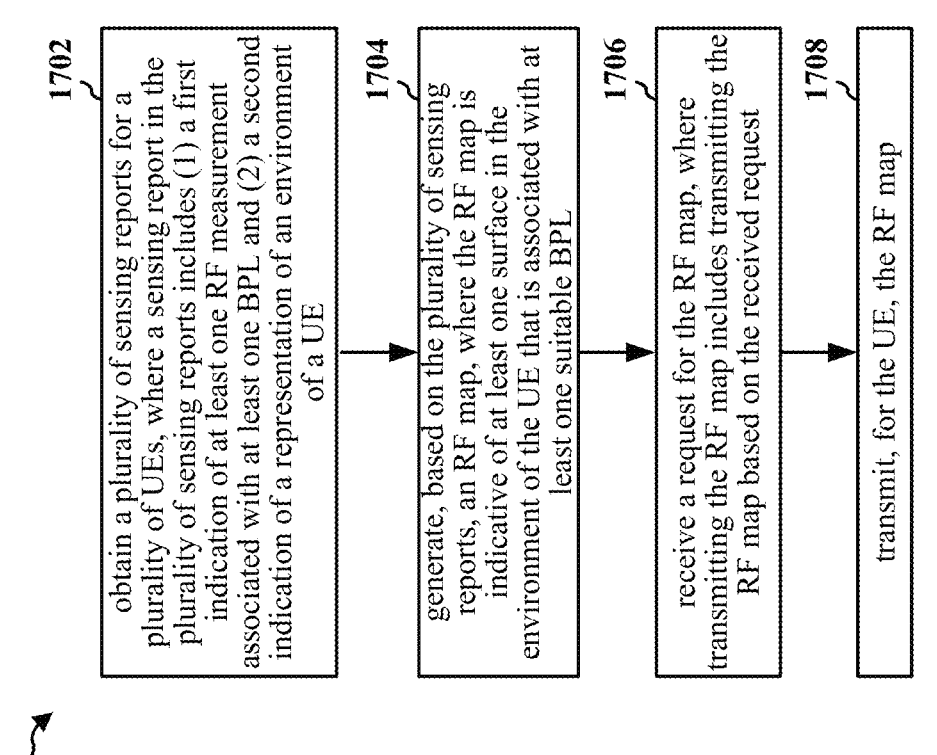

1700

1702 obtain a plurality of sensing reports for a plurality of UEs, where a sensing report in the plurality of sensing reports includes (1) a first indication of at least one RF measurement associated with at least one BPL and (2) a second indication of a representation of an environment of a UE

1704 generate, based on the plurality of sensing reports, an RF map, where the RF map is indicative of at least one surface in the environment of the UE that is associated with at least one suitable BPL

1706 receive a request for the RF map, where transmitting the RF map includes transmitting the RF map based on the received request

1708 transmit, for the UE, the RF map

FIG. 17

RF MAP CONSTRUCTION VIA AGGREGATION OF MULTIPLE SENSING UE REPORTS

TECHNICAL FIELD

The present disclosure relates generally to communication systems, and more particularly, to user equipment (UE) sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus includes at least one memory; and at least one processor coupled to the at least one memory and, based at least in part on information stored in the at least one memory, the at least one processor, individually or in any combination, is configured to: transmit a sensing report including (1) a first indication of at least one radio frequency (RF) measurement associated with at least one beam pair link (BPL) and (2) a second indication of a representation of an environment of the UE; obtain an RF map based on the transmitted sensing report, where the RF map is indicative of at least one surface in the environment of the UE that is associated with at least one suitable BPL; and communicate based on the RF map.

In an aspect of the disclosure, a method, a computer-readable medium, and an apparatus for wireless communication at a network node are provided. The apparatus includes at least one memory; and at least one processor coupled to the at least one memory and, based at least in part on information stored in the at least one memory, the at least one processor, individually or in any combination, is configured to: obtain a plurality of sensing reports for a plurality of user equipments (UEs), where a sensing report in the plurality of sensing reports includes (1) a first indication of at least one radio frequency (RF) measurement associated with at least one beam pair link (BPL) and (2) a second indication of a representation of an environment of a UE; generate, based on the plurality of sensing reports, an RF map, where the RF map is indicative of at least one surface in the environment of the UE that is associated with at least one suitable BPL; and transmit, for the UE, the RF map.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 is a diagram illustrating example aspects of beam management (BM).

FIG. 12 is a diagram illustrating an example of service discovery.

FIG. 14 is a flowchart of a method of wireless communication.

FIG. 15 is a flowchart of a method of wireless communication.

FIG. 16 is a flowchart of a method of wireless communication.

FIG. 17 is a flowchart of a method of wireless communication.

DETAILED DESCRIPTION

Figure 1:
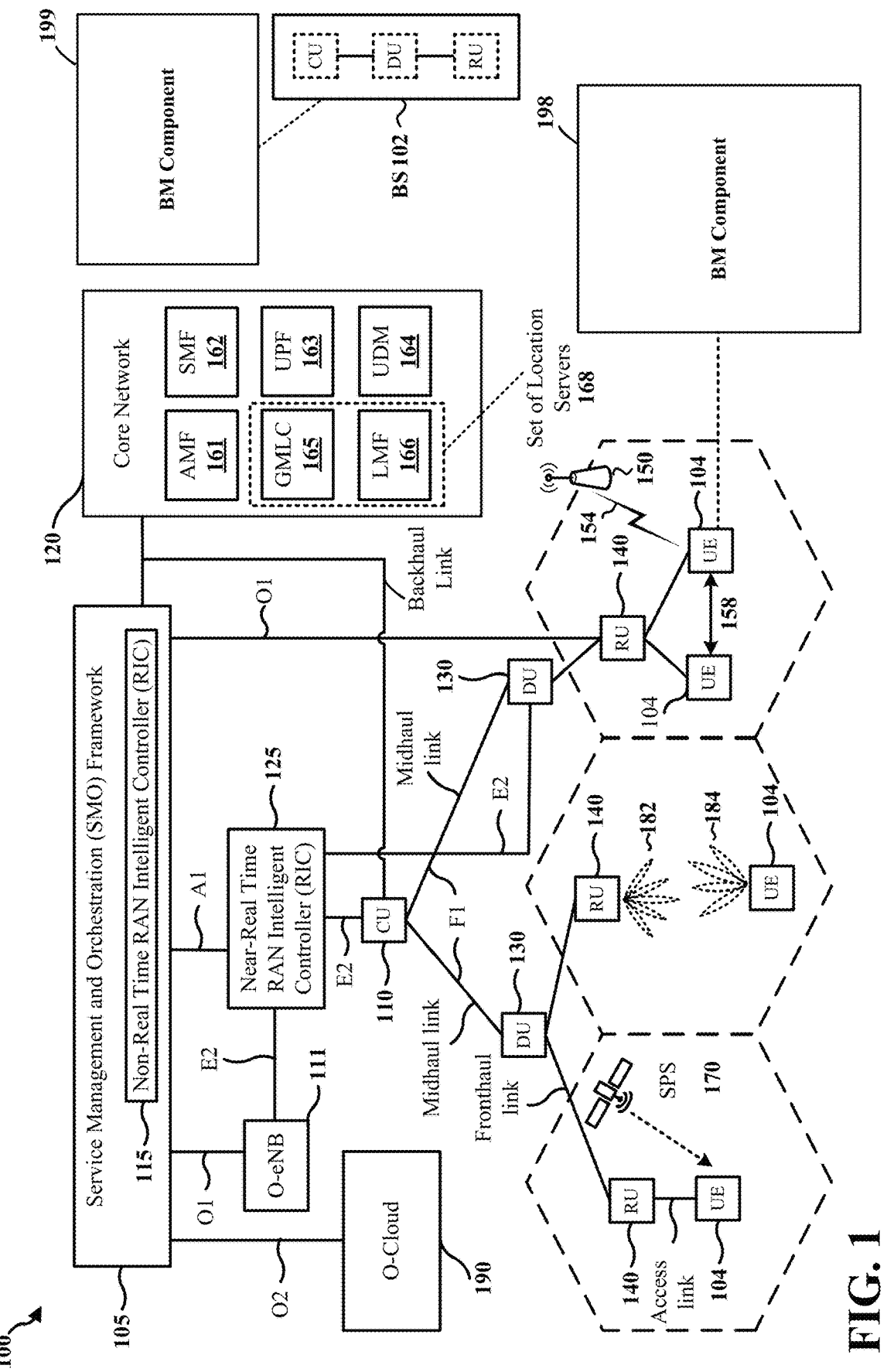
FIG. 1 is a diagram illustrating an example of a wireless communications system and an access network.

Some wireless communication systems (e.g., 5G NR) may utilize beam management (BM) in order to optimize communications between a user equipment (UE) and a base station. BM may refer to a process of determining a transmit (Tx) and receive (Rx) beam alignment that achieves a suitable Tx-Rx communication quality. A base station may generate an RF map based on measurements from multiple UEs at different locations in an environment in order to facilitate UE BM. The RF map may indicate beam directions and/or beam widths that were suitable for the multiple UEs in the environment for communicating with a base station. However, a quality of the RF map may depend on aggregating measurements from multiple densely located UEs over different locations and/or orientations. Furthermore, dynamic changes in the environment may impact the quality of the RF map as well, that is, RF measurements performed in a dynamically changing environment may result in an RF map with a diminished quality. Additionally, a quality of the RF map may depend on a spatial sampling factor used by a UE for RF measurements.

Various technologies pertaining to RF map construction at an edge server via aggregation of multiple sensing UE reports is described herein. In an example, a UE transmits a sensing report including (1) a first indication of at least one radio frequency (RF) measurement associated with at least one beam pair link (BPL) and (2) a second indication of a representation of an environment of the UE. The UE obtains an RF map based on the transmitted sensing report, where the RF map is indicative of at least one surface in the environment of the UE that is associated with at least one suitable BPL. The UE communicates based on the RF map. Vis-à-vis transmitting the sensing report and communicating based on the (obtained) RF map, the UE may communicate with a base station with improved reliability. Furthermore, as the sensing report includes a first indication of at least one RF measurement and a second indication of a representation of the environment of the UE, the RF map may be obtained by the UE without utilizing dense sampling information at different locations around the UE. Furthermore, as the sensing report includes the first indication of the at least one RF measurement and the second indication of the representation of the environment of the UE, the RF map may be adaptable to dynamic environment changes of the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF)

163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a BM component 198 that may be configured to transmit a sensing report including (1) a first indication of at least one radio frequency (RF) measurement associated with at least one beam pair link (BPL) and (2) a second indication of a representation of an environment of the UE; obtain an RF map based on the transmitted sensing report, where the RF map is indicative of at least one surface in the environment of the UE that is associated with at least one suitable BPL; and communicate based on the RF map. In certain aspects, the base station 102 may have a BM component 199 that may be configured to obtain a plurality of sensing reports for a plurality of user equipments (UEs), where a sensing report in the plurality of sensing reports includes (1) a first indication of at least one radio frequency (RF) measurement associated with at least one beam pair link (BPL) and (2) a second indication of a representation of an environment of a UE; generate, based on the plurality of sensing reports, an RF map, where the RF map is indicative of at least one surface in the environment of the UE that is associated with at least one suitable BPL; and transmit, for the UE, the RF map. Although the following description may be focused on 5G NR, the concepts described herein may also be applicable to other wireless communication systems as well.

Figures 2A, 2B, 2C, 2D:
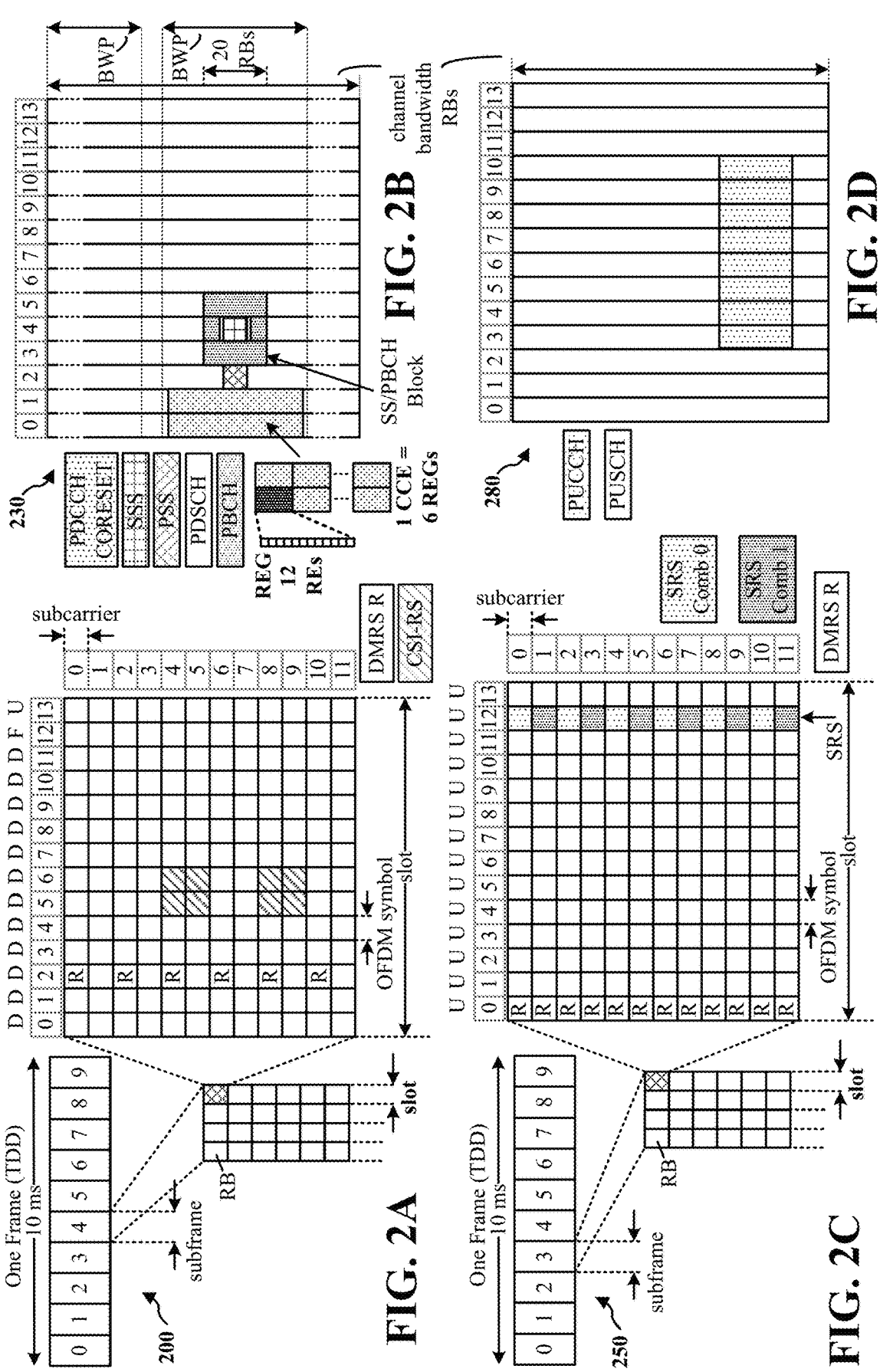
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended.

For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^\mu \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
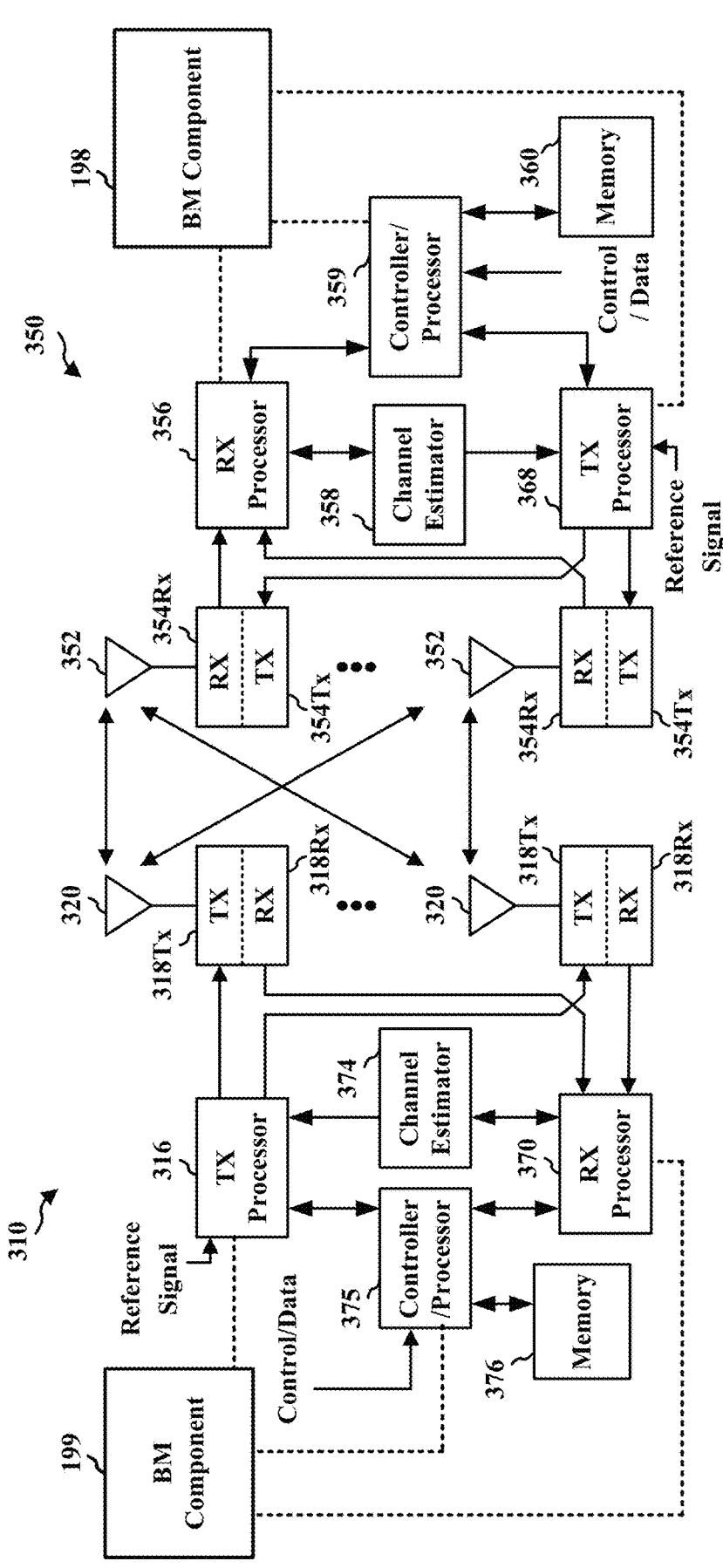
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the BM component 198 of FIG. 1.

At least one of the TX processor 316, the RX processor 370, and the controller/processor 375 may be configured to perform aspects in connection with the BM component 199 of FIG. 1.

Figure 4:
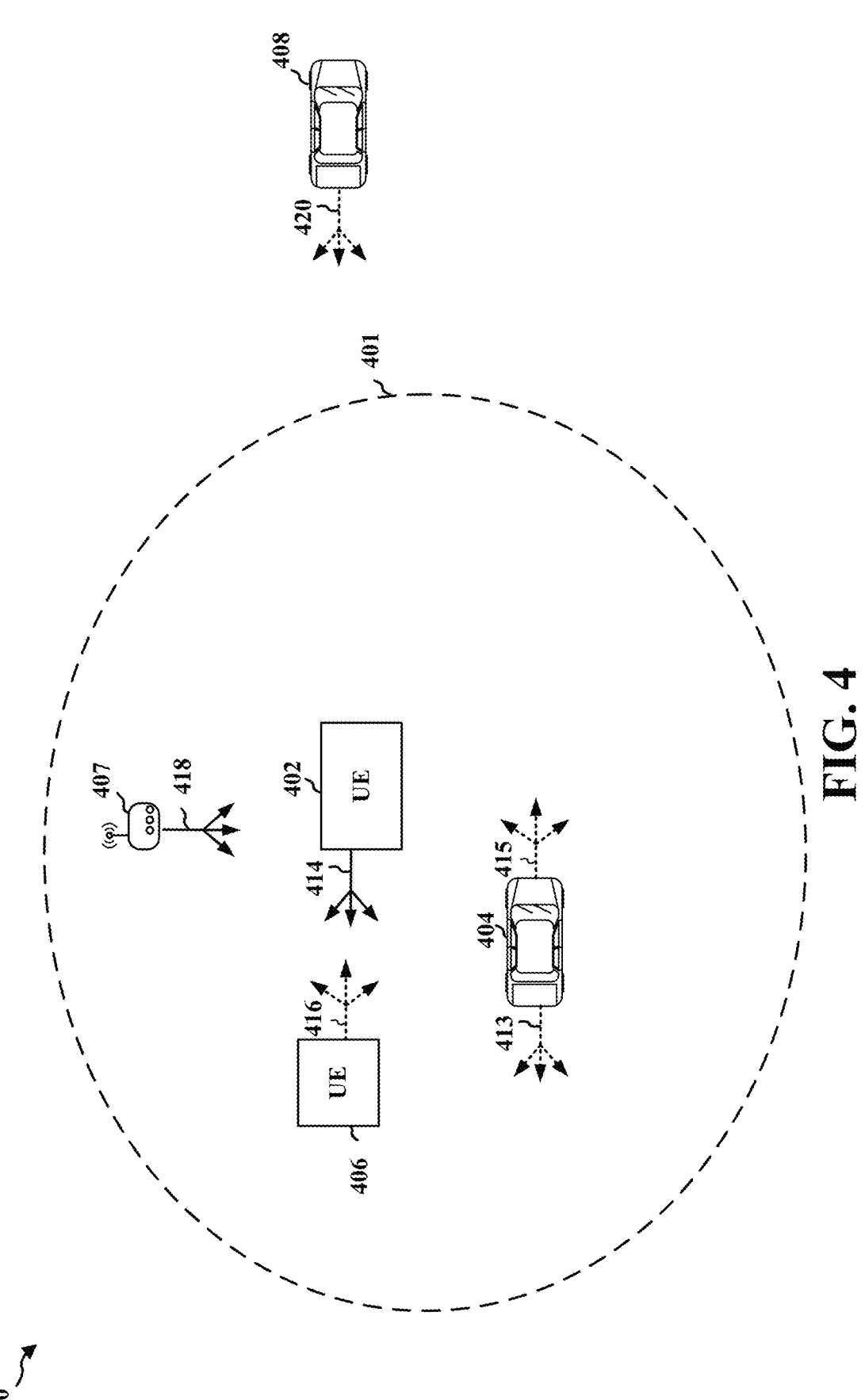
FIG. 4 illustrates example aspects of sidelink communication between devices, in accordance with aspects presented herein.

FIG. 4 illustrates an example 400 of sidelink communication between devices. The communication may be based on a slot structure including aspects described in connection with FIG. 2A, FIG. 2B, FIG. 2C, and/or FIG. 2D. For example, the UE 402 may transmit a sidelink transmission 414, e.g., including a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of transmission time intervals (TTIs), as well as the RBs that may be occupied by the data transmission. The SCI may be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit sidelink transmissions 413, 415 intended for receipt by other UEs within a range 401 of UE 404, and UE 406 may transmit sidelink transmission 416. Additionally, or alternatively, a roadside unit (RSU) 407 may receive communication from and/or transmit communication transmission 418 to UEs 402, 404, 406, 408. An RSU may refer to a transceiver mounted along or near a road or pedestrian passageway. An RSU may collect data from a static sensor area along a road and the RSU may transmit the data to other devices (e.g., traffic control devices).

Sidelink communication may be based on one or more transmission modes. In one transmission mode for a first radio access technologies (RAT) (which may be referred to herein as "Mode 4" of a first RAT), a wireless device may autonomously select resources for transmission. A network entity may allocate one or more sub-channels for wireless devices to transmit one or more transport blocks (TB) using the one or more channels. A wireless device may randomly reserve an allocated resource for one-shot transmissions. A wireless device may use a sensing-based semi-persistent transmission scheme, or semi-persistent scheduling (SPS) mode, to select a reserved resource for transmission. For example, before selecting a resource for data transmission, a wireless device may first determine whether resources have been reserved by another wireless device. Semi-persistent transmission allows a wireless device to take advantage of semi-periodic traffic arrival by using historical interference patterns to predict future interference patterns. The wireless device may sense at least one of priority information, energy sensing information, or PSCCH decoding information to optimize resource selection. In one aspect, a wireless device may avoid selecting resources for a transmission that are scheduled to be used for a higher priority packet transmission. In another aspect, a wireless device may rank resources according to how much energy is received, and may pick the lowest energy resources. In another aspect, a wireless device may avoid resources for whom control is decoded or for which the received energy may be above a threshold.

A network entity may configure the periodicity of the reserved sub-channels using DCI transmitted over a PDCCH. The period of a semi-persistent transmission resource may be, for example, 20, 50, 100, 200, 300, 400, 500, 600, 700, 800, 900, or 1000 milliseconds (ms). Such a periodicity may be referred to as a resource reservation period (RSVP). In alternative embodiments, the periodicity may be referred to as a resource reservation interval (RRI).

A network entity may limit the possible values for the periodicity of the transmission resource. A wireless device, such as a UE, may select a transmission resource based on the periodicity of an arrival packet. A counter may be used to trigger periodic reselections. For example, a wireless device may randomly select a counter between 5 and 15, and may reserve a resource based on the counter (e.g., 10*counter resource reservation periods, a number of MAC protocol data unit (PDU) transmissions equal to the counter). After every transmission, or after a reservation period passes, the counter may be decremented until it hits zero. For example, where a reservation period is 100 ms and a counter is 10, every 100 ms the counter may decrement until one second(s) passes, upon which the wireless device may then reselect a sidelink resource. In one aspect, the wireless device may reselect the sidelink resource based on a re-selection probability value. For example, in response to the counter decrementing to zero, the wireless device may reselect the sidelink resource an x % of the time, and may not reselect the sidelink resource (1−x) % of the time, where x<1. The wireless device may then reset the counter and repeat the process when the counter decrements to zero again. A wireless device may measure a received signal strength indicator (RSSI) measurement for each slot of 100 ms, and may then calculate the RSSI of the frequency band resource as an average of each of the 10 RSSI measurements taken over the period of one second. A wireless device may select a suitable or desirable frequency band resource as a resource that is in one of the bottom 20% of ranked RSSI calculated resources for a wireless device. In some aspects, the counter may be decremented after every MAC PDU transmission. A wireless device may be configured to reselect a sidelink resource after a counter expires (i.e., reaches zero), and a MAC PDU is received.

Sidelink communication for other RATs may be based on different types or modes of resource allocation mechanisms. In another resource allocation mode for a second RAT (which may be referred to herein as "Mode 1" of a second RAT), centralized resource allocation may be provided by a network entity. For example, a network entity may determine resources for sidelink communication and may allocate resources to different wireless devices to use for sidelink transmissions. In this first mode, a wireless device may receive an allocation of sidelink resources from a base station. In a second resource allocation mode (which may be referred to herein as "Mode 2"), distributed resource allocation may be provided. In Mode 2, each wireless device may autonomously determine resources to use for sidelink transmission. In order to coordinate the selection of sidelink resources by individual wireless devices, each wireless device may use a sensing technique to monitor for resource reservations by other sidelink wireless devices and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a wireless device may reserve resources for transmission in a current slot and up to two future slots (discussed below).

Thus, in the second mode (e.g., Mode 2), individual wireless devices may autonomously select resources for sidelink transmission, e.g., without a central entity such as a base station indicating the resources for the device. A first wireless device may reserve the selected resources in order to inform other wireless devices about the resources that the first wireless device intends to use for sidelink transmission (s).

In some examples, the resource selection for sidelink communication may be based on a sensing-based mechanism. For instance, before selecting a resource for a data transmission, a wireless device may previously determine whether resources have been reserved by other wireless devices.

For example, as part of a sensing mechanism for a resource allocation mode 2 of a second RAT, a wireless device may determine (e.g., sense) whether a selected sidelink resource has been reserved by other wireless device(s) before selecting a sidelink resource for a data transmission. If the wireless device determines that the sidelink resource has not been reserved by other wireless devices, the wireless device may use the selected sidelink resource for transmitting the data, e.g., in a PSSCH transmission. The wireless device may estimate or determine which radio resources (e.g., sidelink resources) may be in-use and/or reserved by others by detecting and decoding sidelink control information (SCI) transmitted by other wireless devices. The wireless device may use a sensing-based resource selection algorithm to estimate or determine which radio resources are in-use and/or reserved by others. The wireless device may receive SCI from another wireless device that may include reservation information based on a resource reservation field in the SCI. The wireless device may continuously monitor for (e.g., sense) and decode SCI from peer wireless devices. The SCI may include reservation information, e.g., indicating slots and RBs that a particular wireless device has selected for a future transmission. The wireless device may exclude resources that are used and/or reserved by other wireless devices from a set of candidate resources for sidelink transmission by the wireless device, and the wireless device may select/reserve resources for a sidelink transmission from the resources that are unused and therefore form the set of candidate resources. A wireless device may continuously perform sensing for SCI with resource reservations in order to maintain a set of candidate resources from which the wireless device may select one or more resources for a sidelink transmission. Once the wireless device selects a candidate resource, the wireless device may transmit SCI indicating its own reservation of the resource for a sidelink transmission. The number of resources (e.g., sub-channels per subframe) reserved by the wireless device may depend on the size of data to be transmitted by the wireless device. Although the example is described for a wireless device receiving reservations from another wireless device, the reservations may be received from an RSU or other device communicating based on sidelink.

Figure 5:
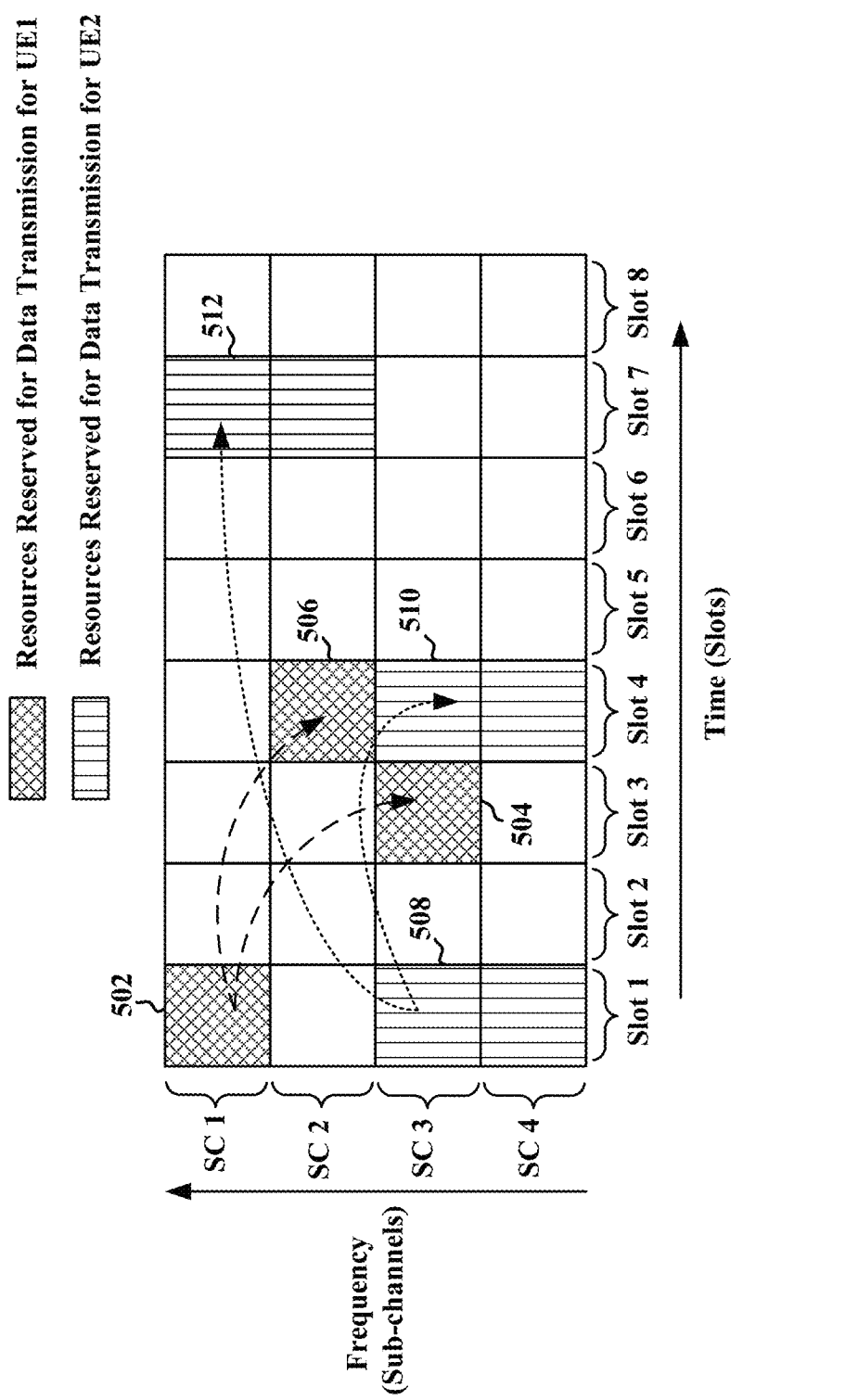
FIG. 5 illustrates examples of a resource reservation system for sidelink communication.

FIG. 5 is an example 500 of time and frequency resources showing reservations for sidelink transmissions. The resources may be in a sidelink resource pool, for example. The resource allocation for each wireless device may be in units of one or more sub-channels in the frequency domain (e.g., sub-channels SC1 to SC 4), and may be based on one slot in the time domain. A wireless device may use resources in the current slot to perform an initial transmission, and may reserve resources in future slots for retransmissions. In this example, two different future slots may be reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may be referred to as a resource selection window.

A first UE ("UE1) may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slots 3 and SC 2 at slot 4 for future retransmissions as shown by FIG. 4. UE1 then may transmit information regarding which resources are being used and/or reserved by it to other UE(s). UE1 may do so by including the reservation information in the reservation resource field of the SCI, e.g., a first stage SCI.

FIG. 5 illustrates that a second UE ("UE2") may reserve resources in sub-channels SC 3 and SC 4 at time slot 1 for data transmission 508, and may reserve data transmission 510 (a retransmission of data transmission 508) at time slot 4 using sub-channels SC 3 and SC 4, and may reserve data transmission 512 (a retransmission of data transmission 508) at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or for an initial transmission.

A UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/ reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmissions 508, 510, and 512.

There may be a timeline for a sensing-based resource selection. For example, a UE may sense and decode the SCI received from other UEs during a sensing window, e.g., a time duration prior to resource selection. Based on the sensing history during the sensing window, a UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

In some aspects, for example when reserving resources using mode 4 of the first RAT or mode 2 of the second RAT, a wireless device, such as a UE, may use semi-persistent scheduling (SPS) to make periodic reservations for sidelink resources. On a per resource pool basis, a reservation of a sidelink resource for a transmission of a TB may reserve a number of periodic sidelink resources. For example, a wireless device may use an SCI associated with a first TB to reserve a sidelink resource for an initial transmission of a second TB. Such periodic reservations may be used for retransmissions of the initial transmission. The SCI may include a period, such as every 100 ms, which may signal an application of the same reservation with respect to resources within a window at subsequent periods. The SCI may use a number of bits, such as one, two, three, or four bits to indicate the period. The number of periodic reservations may be limited by a threshold, such as NMAX. For example, a reservation for a TB at time 0 ms may signal a periodic reservation (e.g., at 100, 200, 300, 400, 500, 600, 700, 800, 900, and 1000 ms). Such periodic values may be configured or preconfigured in any suitable manner, for example via RRC configuration from a base station, pre-programed in factory, or via a pervious transmission. In some aspects, the number of periodic reservations may be one, two, or more. In some aspects, the wireless device may measure an average RSSI measurement over a number of periods to rank resources by the highest and lowest RSSI, and may select a candidate resource with the lowest RSSI.

FIG. 6 is a diagram 600 illustrating example aspects of beam management (BM). BM may refer to a process of establishing and retaining a suitable beam pair link, that is, establishing and retaining a Tx beam (i.e., a Tx beam direction) and an Rx beam (i.e., an Rx beam direction) that jointly provide suitable connectivity. BM may include procedures that are based on beam measurements performed by a UE and that are based on reporting of certain reference signals.

In an example, a base station 602 (e.g., a gNB) may configure a UE 604 to monitor for reference signal(s). In an example, the reference signal(s) may be or include an SSB or a CSI-RS. An SSB may refer to a reference signal transmitted by a network that is used by a UE for multiple purposes, such as synchronization and obtaining system information. The base station 602 may also configure measurements and reporting (i.e., a measurement configuration and a report configuration) for the UE 604. The base station 602 may utilize a plurality of Tx beams to beamform transmission of the configured reference signal(s). The UE 604 may utilize a plurality of Rx beams to measure the reference signal(s) according to the measurement configuration. The UE 604 may report the measurements of the reference signal(s) (i.e., transmit the measurements) to the base station 602 according to the reporting configuration. The base station 602 may select and/or control the Tx beam(s) based in part on the reported measurements. The base station 602 may indicate (i.e., transmit indications of) selected and/or controlled Tx beam(s) to the UE 604 via a transmission configuration indication (TCI) framework. The UE 604 may select Rx beam(s) based in part on the Tx beam(s) indicated by the base station 602 and/or based on previous reference signal measurements performed by the UE 604.

Tx and/or Rx beams may be based upon a hierarchical beam codebook (e.g., a hierarchical base station beam codebook, a hierarchical UE beam codebook, etc.). The hierarchical beam codebook may indicate/specify Tx and/or Rx beams having different patterns (e.g., different shapes, different widths, different peak gains, etc.). The hierarchical beam codebook may also indicate/specify Tx and/or Rx beams that are structured in multiple levels with given spatial/hierarchical relationships (e.g., parent, adjacent, children, etc.). In an example, the Tx and/or Rx beams specified in the hierarchical beam codebook may include SSB Tx beams 606, CSI-RS Tx beams 608, level 1 (L1) UE Rx beams 610, level 2 (L2) UE Rx beams 612, and/or level 3 (L3) UE Rx beams 614.

Figure 7:
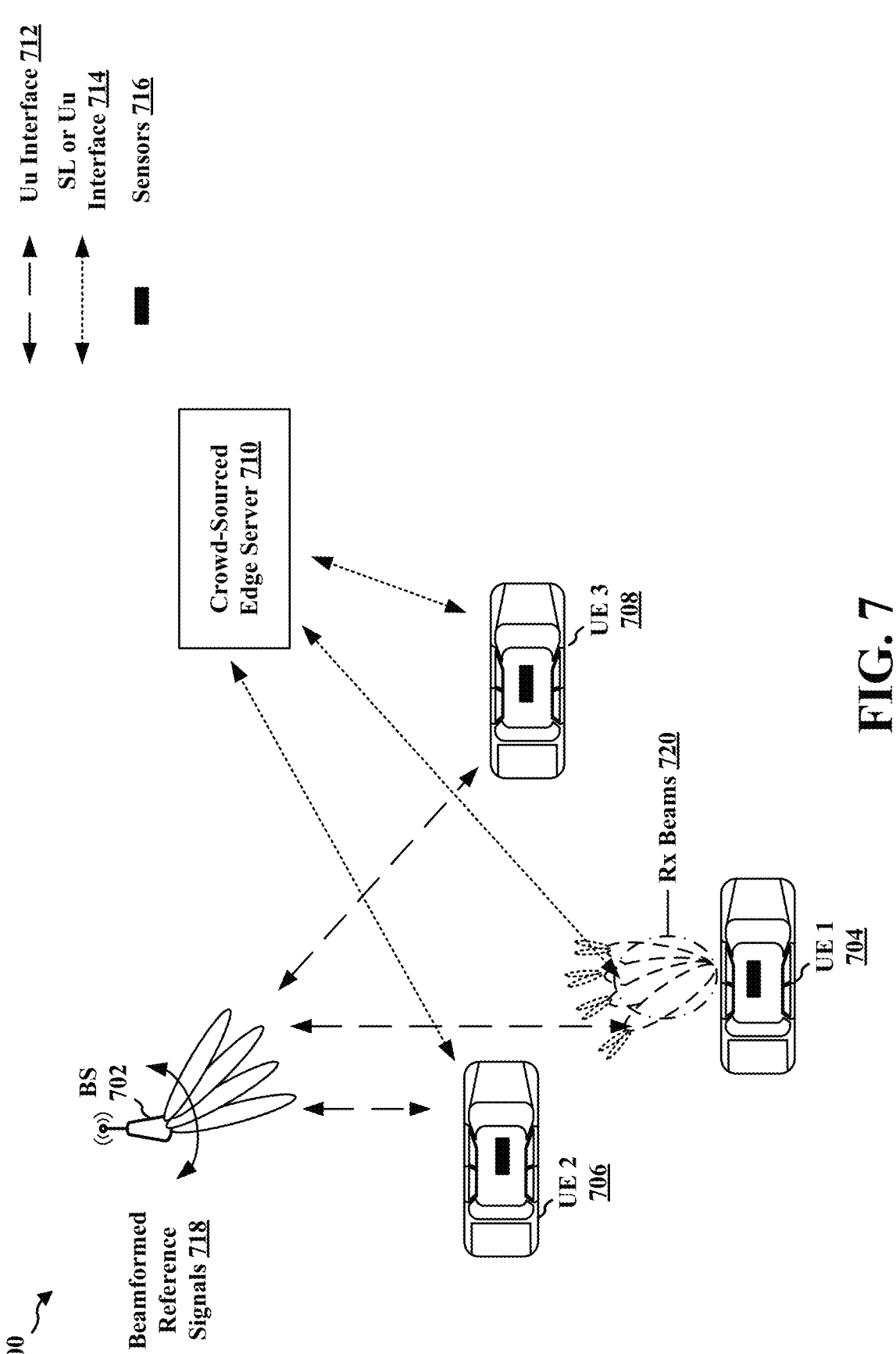
FIG. 7 is a diagram illustrating an example of crowd-sourced beam management.

FIG. 7 is a diagram 700 illustrating an example of crowd-sourced beam management. The diagram 700 depicts a base station 702 (e.g., a gNB), a first UE 704, a second UE 706, a third UE 708, and a crowd-sourced edge server 710. The first UE 704, the second UE 706, and/or the third UE 708 may be vehicular UEs. The first UE 704, the second UE 706, and/or the third UE 708 may communicate with the base station 702 over a universal mobile telecommunications system (UMTS) air interface (a Uu interface 712). The first UE 704, the second UE 706, and/or the third UE 708 may communicate with the crowd-sourced edge server 710 via a sidelink (SL) interface or a Uu interface 714. The first UE 704, the second UE 706, and/or the third UE 708 may be equipped with sensors 716 that aid the first UE 704, the second UE 706, and/or the third UE 708 with perceiving their respective environments. In an example, the sensors 716 may be or include cameras, radar sensors, lidar sensors, sonar sensors, infrared sensors, etc. The first UE 704, the second UE 706, and the third UE 708 may be collectively referred to as "sensing UEs." Information generated by the sensors 716 (i.e., "sensing information") may be utilized to facilitate communication between the sensing UEs and the base station 702.

The crowd-sourced edge server 710 may be a roadside unit (RSU), a cloud server, etc. In an example, the crowd-sourced edge server 710 may be hosted at a base station (not shown in FIG. 7) or the crowd-sourced edge server 710 may be hosted at an RSU. The crowd-sourced edge server 710 may serve a given geographical area. In an example, the given geographical area may be a geographical area in which the first UE 704, the second UE 706, and the third UE 708 are currently located in and/or are operating in.

In an example, the base station 702 and the sensing UEs may be capable of communicating over FR2. However, in order to communicate over FR2, the base station 702 and the sensing UEs may engage in beam management in order to align Tx and Rx beams between the base station 702 and the sensing UEs. Beam management may entail establishment and maintenance of beam pair links (BPLs) in mobile and/or dynamic scenarios. The sensing UEs may have fixed beam codebooks. A beam codebook may include a plurality of pre-defined offline-designed beams generated by antenna panels mounted on/included in a UE (e.g., the first UE 704). A UE beam policy may refer to a process of generating a schedule (e.g., a list) of UE beams that may be used to measure configured reference signals at measurement opportunities (i.e., configured time instances at which measurements are to be performed). Optimization of a UE beam policy may reduce latency (i.e., a time to establish and track a suitable BPL), enhance performance (e.g., via increased throughput), and/or reduce UE power consumption (e.g., a UE may perform less measurements to determine a suitable beam pair when a UE beam policy is optimized).

The base station 702 may transmit beamformed reference signals 718 (e.g., beamformed SSBs, beamformed CSI-RS, etc.). In an example, the first UE 704 may engage in BM based upon the beamformed reference signals 718 and Rx beams 720. In an example, the Rx beams 720 may be specified in a hierarchical UE beam codebook (e.g., a hierarchical sensing-UE beam codebook).

Various technologies described herein may leverage radio frequency (RF) measurements and sensing information at multiple vehicular UEs (e.g., the first UE 704, the second UE 706, and/or the third UE 708) to construct and dynamically update an RF map for beam management for a given region. For example, the technologies described herein may identify certain surfaces (e.g., buildings, large road signs, etc.) that are responsible for reflecting RF signals. The RF map may be used by a UE (e.g., the first UE 704) in order to assist with communication with a base station (e.g., the base station 702). An RF map for beam management may refer to an overlaying of a map with RF information that a UE may use for Rx beam management at a given location and orientation. In one example, the RF information for a UE may include measurements that are indicative of Rx beam directions, Rx beam widths, etc. that other UEs have selected for suitable performance at a given UE location/orientation. Furthermore, the technologies described herein may relate to a framework in which a plurality of sensing UEs collaborate indirectly towards reducing a complexity of a BM process.

Figure 8:
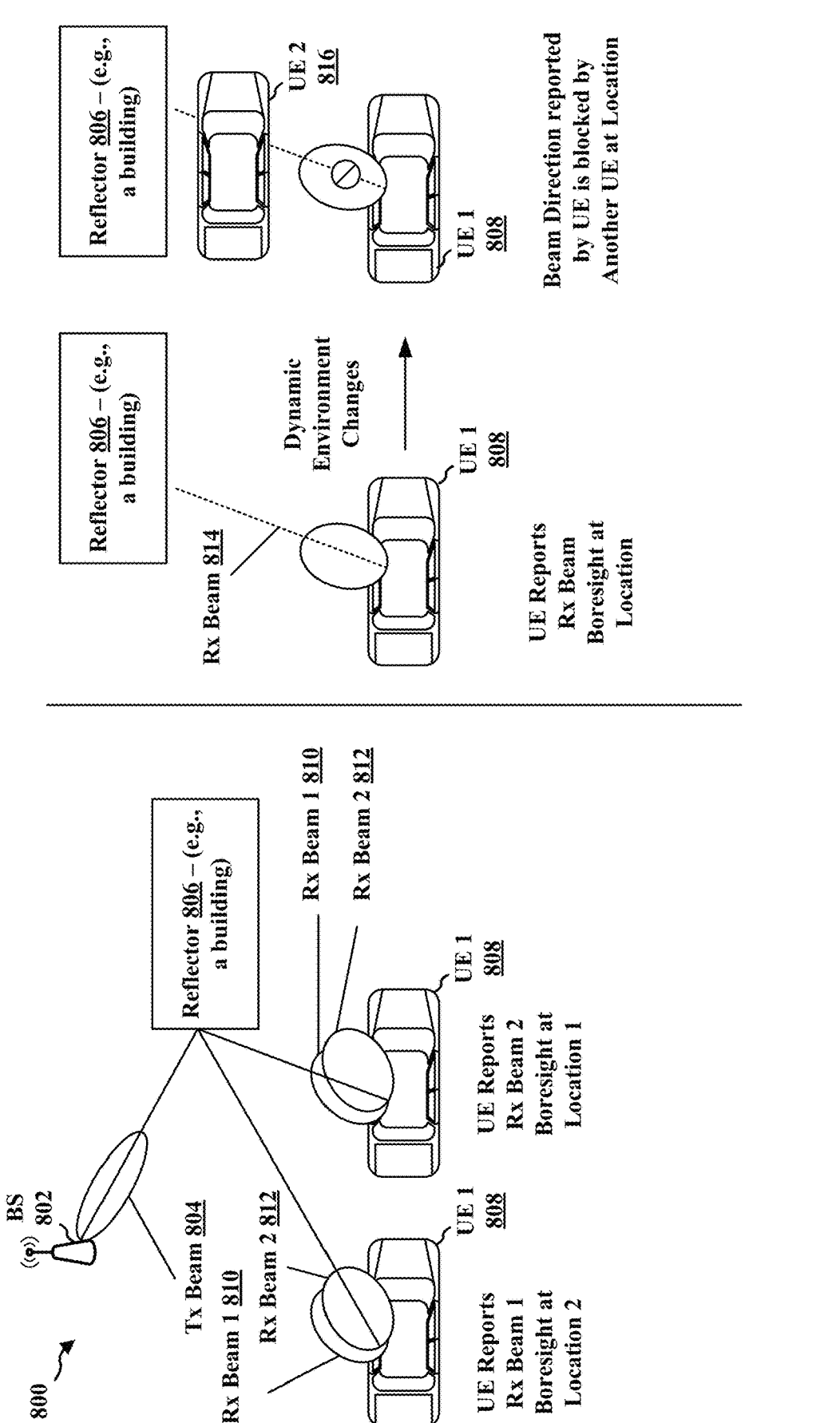
FIG. 8 is a diagram illustrating example aspects pertaining to radio frequency (RF) maps.

FIG. 8 is a diagram 800 illustrating example aspects pertaining to radio frequency (RF) maps. In an example, RF maps may be generated for beam management (BM), where the RF maps may include information regarding beam directions and/or beam widths for a given location and orientation that were suitable for communication with a base station (e.g., an RF map may be a mapping between a location and a direction of a suitable beam). However, in the example, constructing the RF map may entail collecting measurements from multiple UEs at each location of interest. As such, a quality of the RF map may depend on aggregating measurements from multiple UEs located in a dense area over different locations and orientations. Dynamic changes in an environment may make learning suitable beam directions and/or suitable beam widths difficult. For instance, a beam direction at a given location may be suitable for communication with a base station, but the beam direction may be blocked for a certain percentage (e.g., a large percentage) of UEs, which may result in average behavior being learned (i.e., the beam direction may be used by UEs for which the beam direction is less than suitable). Furthermore, accuracy and/or resolution of the RF map may depend on a UE Rx beam codebook, that is, beam directions and/or beam widths may depend on a UE Rx beam codebook. The difference between a UE direction of a beam reported by a UE (i.e., a beam boresight) versus an actual location of the beam may depend on a spatial sampling factor used by the UE, which may impact quality of an RF map.

In an example pertaining to RF map generation for BM, a base station 802 may transmit a reference signal via a Tx beam 804, where the Tx beam 804 may be reflected off of a reflector 806 (e.g., a building). A first UE 808 (e.g., a vehicular UE) may report a boresight for a first Rx beam 810 when the first UE 808 is at a first location, that is, at the first location, the first Rx beam 810 may be suitable for receiving the reference signal associated with the Tx beam 804 that is reflected off of the reflector 806. The first UE 808 may report a boresight for a second Rx beam 812 when the first UE 808 is at a second location, that is, at the second location, the second Rx beam 812 may be suitable for receiving the reference signal associated with the Tx beam 804 that is reflected off of the reflector 806. However, reported beam directions of the first Rx beam 810 and the second Rx beam 812 may be mismatched with an actual ray direction (i.e., fidelity may depend on a UE Rx beam codebook).

In another example pertaining to RF map generation for BM, the first UE 808 may report a boresight for an Rx beam 814 when the first UE 808 is at a location, that is, at the location, the Rx beam 814 may be suitable for receiving the reference signal associated with the Tx beam 804 that is reflected off of the reflector 806 (e.g., a building). However, a dynamic environment of the first UE 808 may change when the UE is at the location. For instance, a second UE 816 may move between the first UE 808 and the reflector 806 when the first UE 808 is at the location. As a result, the Rx beam 814 previously reported by the first UE 808 may no longer be a suitable beam, which may limit accuracy of a resulting RF map.

Some wireless communication systems (e.g., 5G NR) may utilize beam management (BM) in order to optimize communications between a user equipment (UE) and a base station. BM may refer to a process of determining a transmit (Tx) and receive (Rx) beam alignment that achieves a suitable Tx-Rx communication quality. A base station may generate an RF map based on measurements from multiple UEs at different locations in an environment in order to facilitate UE BM. The RF map may indicate beam directions and/or beam widths that were suitable for the multiple UEs in the environment for communicating with a base station. However, a quality of the RF map may depend on aggregating measurements from multiple densely located UEs over different locations and/or orientations. Furthermore, dynamic changes in the environment may impact the quality of the RF map as well, that is, RF measurements performed in a dynamically changing environment may result in an RF map with a diminished quality. Additionally, a quality of the RF map may depend on a spatial sampling factor used by a UE for RF measurements.

Various technologies pertaining to RF map construction at an edge server via aggregation of multiple sensing UE reports is described herein. In an example, a UE transmits a sensing report including (1) a first indication of at least one radio frequency (RF) measurement associated with at least one beam pair link (BPL) and (2) a second indication of a representation of an environment of the UE. The UE obtains an RF map based on the transmitted sensing report, where the RF map is indicative of at least one surface in the environment of the UE that is associated with at least one suitable BPL. The UE communicates based on the RF map.

Vis-à-vis transmitting the sensing report and communicating based on the (obtained) RF map, the UE may communicate with a base station with improved reliability. Furthermore, as the sensing report includes a first indication of at least one RF measurement and a second indication of a representation of the environment of the UE, the RF map may be obtained by the UE without utilizing dense sampling information at different locations around the UE. Furthermore, as the sensing report includes the first indication of the at least one RF measurement and the second indication of the representation of the environment of the UE, the RF map may be adaptable to dynamic environment changes of the UE.

In one aspect, RF and sensing information may be collected from multiple vehicular UEs at edge servers in order to construct and update an RF map of a given region. For example, the RF and sensing information may be used to find given surfaces (buildings, large road signs, etc.) responsible for reflecting RF signals. The RF map may be used by UEs to reduce complexity of receive (Rx) beam management (BM) operations. Specifically, a UE may use the RF map to prioritize its beam search directions using candidates suggested by the RF map, e.g., directions associated with the given surfaces reported by multiple UEs.

Figure 9:
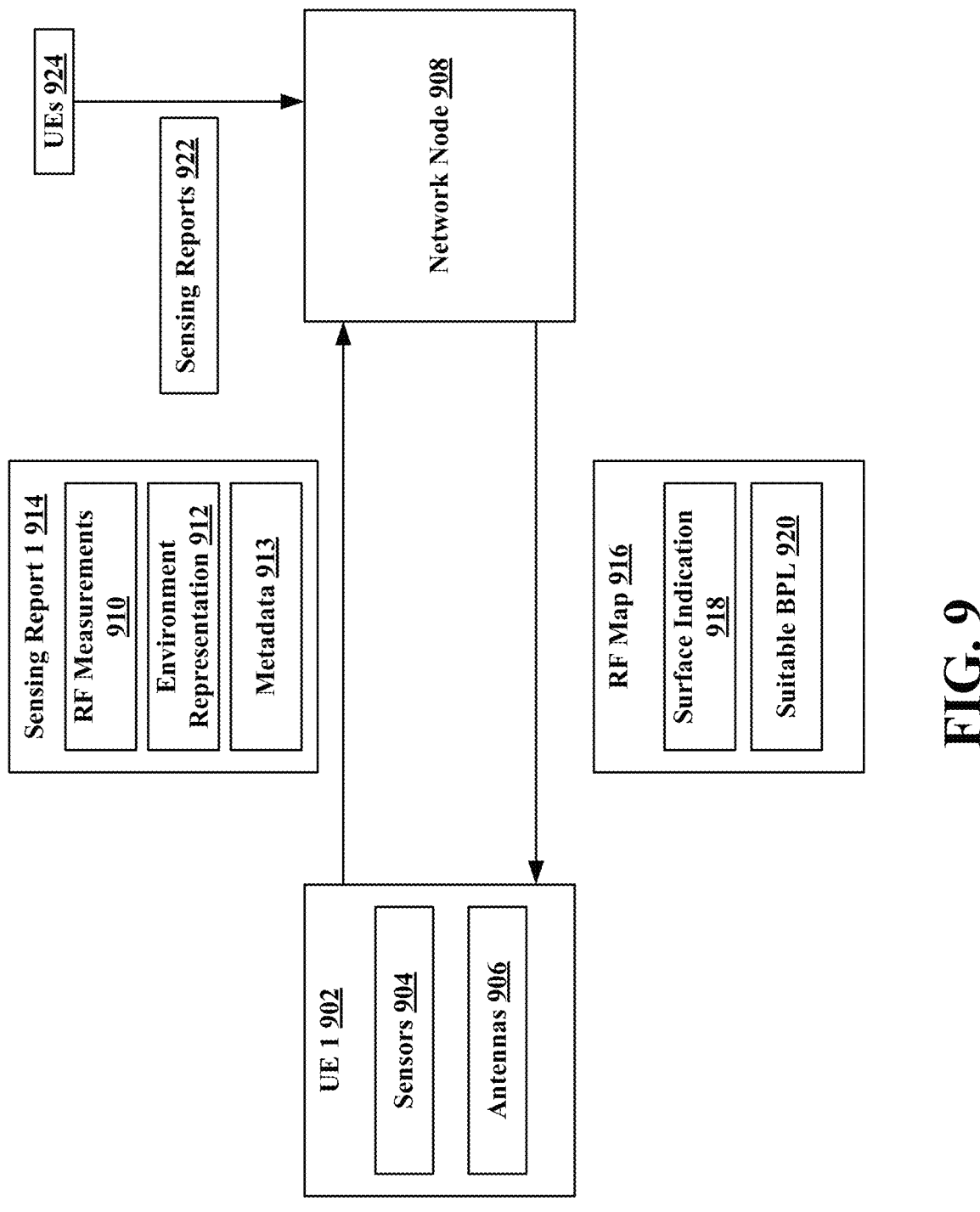
FIG. 9 is a diagram illustrating an example of generating an RF map.

FIG. 9 is a diagram 900 illustrating an example of generating an RF map. A first UE 902 (i.e., a sensing UE) may be a vehicular UE located in an environment. In an example, the first UE 902 may be the UE 104, the UE 350, the apparatus 1804, etc. The first UE 902 may include sensors 904 (i.e., on-board sensors) and antennas 906. A sensor may refer to a device which detects or measures a physical property and which records, indicates, or otherwise responds to the physical property. Data generated/produced/obtained by a sensor may be referred to as sensor data. In an example, the sensors 904 may be or include cameras, radar sensors, lidar sensors, sonar sensors, infrared sensors, etc. A base station (e.g., a gNB, the base station 702, etc.) may transmit reference signals via Tx beams, where the Tx beams may be reflected off of surfaces in the environment of the first UE 902. The first UE 902 may measure the reference signals via the antennas 906 to obtain RF measurements 910. An RF measurement may be associated with a beam pair link (BPL), that is, the RF measurement may be associated with a link between a Tx beam and an Rx beam. In an example, measuring the reference signals may include performing reference signal received power (RSRP) measurements on the reference signals. An RSRP measurement may be an average power of resource elements that carry cell specific reference signals over an entire bandwidth, that is, an RSRP measurement may be an average received power of a single reference signal resource element. In an example, the reference signals may include SSBs. The first UE 902 may also obtain, via the sensors 904, sensor data about the environment of the first UE 902. In an example, the sensor data may include camera image(s) of the environment of the first UE 902. The first UE 902 may generate a representation of the environment of the first UE 902 (i.e., an environment representation 912) based on the sensor data. The environment representation 912 may be a three-dimensional (3D) representation of the environment. Aspects pertaining to the RF measurements 910 and the environment representation 912 will be discussed in greater detail below.

The first UE 902 may transmit a first sensing report 914 to a network node 908, where the first sensing report 914 may include the RF measurements 910, the environment representation 912 (i.e., a representation of an environment), and metadata 913. In one aspect, the first sensing report 914 may include RF measurements 910 and sensing information.

The metadata 913 may include a location and/or an orientation of the first UE 902. The metadata 913 may aid a device (e.g., a server, a network node, a base station, etc.) in interpreting the environment representation 912. For instance, the metadata 913 may establish a common coordinate system between a UE and a base station at the time the first sensing report 914 is transmitted. In one example, the network node 908 may be the base station that transmitted the reference signals via the Tx beams. In another example, the network node 908 may be an RSU or a server (e.g., an edge server, a crowd-sourced edge server, etc.).

The network node 908 may generate an RF map 916 based on the first sensing report 914. The RF map 916 may include an indication of a surface (i.e., a surface indication 918) in the environment of the first UE 902 and an indication of a suitable beam pair link (BPL) 920. The surface may be a physical surface in the environment of the first UE 902. The suitable BPL 920 may include an indication of Rx beam(s) and a Tx beam(s) that have a suitable connectivity. The RF Map 916 may include an indication as to surfaces that bounce strong signals. In one aspect, the network node 908 may also receive sensing reports 922 generated by UEs 924 (i.e., sensing UEs) in the environment of the first UE 902, where the sensing reports 922 may include RF measurements performed by the UEs 924, environment representations generated by the UEs 924, and metadata (e.g., locations and/or orientations of the UEs 924) similar to the RF measurements 910, the environment representation 912, and the metadata 913. The network node 908 may generate the RF map 916 further based on the sensing reports 922. Further details pertaining to the RF map 916 will be discussed in greater detail below. The network node 908 may transmit the RF map 916 to the first UE 902. The first UE 902 may communicate with a base station (e.g., the network node 908) based on the RF map 916. In one example, the first UE 902 may communicate with the base station via an Rx beam indicated in the suitable BPL 920. In another example, the first UE 902 may perform a beam search based on the RF map 916 to identify a suitable Rx beam, where the beam search may be limited to the Rx beam(s) indicated in the RF map 916. The beam search may include performing RF measurements on reference signal(s) associated with each of the Rx beam(s) indicated in the RF map 916. In an example, the suitable Rx beam may be an Rx beam associated with a highest RF measurement (e.g., a highest RSRP measurement). The first UE 902 may then communicate with the base station using the suitable Rx beam.

An overall flow for dynamic RF map construction (i.e., constructing the RF map 916) according to one aspect is now set forth. The first UE 902 may perform the RF measurements 910. For instance, the first UE 902 may measure RSRPs of configured SSBs. The first UE 902 may overlay sensor data generated by the sensors 904 on RF measurements in order to construct a 3D representation of the environment of the first UE 902, where the 3D representation of the environment may be or include or be associated with the environment representation 912. With more particularity, the first UE 902 may project different beam patterns onto the 3D representation of the environment (obtained from the sensor data) in order to discover physical surfaces (e.g., buildings) in the environment that are associated with bouncing (e.g., reflecting, refracting) suitable RF signals to the first UE 902. In an example, a suitable RF signal may be an RF signal associated with a RF measurement that is above a certain threshold. With even more particularity, the first UE 902 may generate a per Rx beam heat map that encodes RF information and sensing information (i.e., sensor data), where the RF information and the sensing information may be fused together. The heat map may be an m×n matrix (m and n are positive integers) with a given spatial quantization of azimuth and elevation angles. Each entry in the m×n matrix may refer to a beamforming gain an Rx beam observes in a given direction, where the given direction is specified by an azimuth and elevation angle tuple. The first UE 902 may transmit the per Rx beam heat map to the network node 908 along with metadata (e.g., the metadata 913) that may aid the network node in interpreting the per Rx beam heat map. In an example, the per Rx beam heat map may be or include the first sensing report 914. The first UE 902 may transmit the per Rx beam heat map to the network node 908. Furthermore, the UEs 924 (i.e., a plurality of sensing UEs) may also generate and transmit per Rx beam heat maps and metadata to the network node 908. The network node 908 may aggregate the first sensing report 914 and the sensing reports 922 and generate/construct the RF map 916 based on the aggregated sensing reports. In an example, the RF map 916 may indicate a physical surface (i.e., the surface indication 918) that has been reported by the first UE 902 and/or some or all of the UEs 924 as being associated with bouncing suitable RF signals. The first UE 902 may download the RF map 916 from the network node 908. The first UE 902 may utilize the RF map 916 to prioritize certain beam search directions (i.e., Rx beam search directions) using suitable candidate directions suggested/indicated by the RF map 916. For instance, the first UE 902 may prioritize beam search directions associated with the physical surface indicated in the RF map 916. A beam search may refer to a process of searching for a beam (e.g., an Rx beam) that results in a suitable RF measurement (e.g., an RSRP measurement above a certain threshold). In an example with respect to Rx beams, a beam search may entail utilizing candidate Rx beams to receive a reference signal and select a beam in the candidate beams that has a highest RSRP measurement.

Steps pertaining to dynamic RF map construction according to one aspect are now set forth. In a first step (i.e., a discovery phase), UEs (e.g., the first UE 902, the UEs 924, etc.) may discover the presence of a dynamic RF map service. The UEs may be sensing UEs. The UEs may subscribe to the dynamic map service (described in greater detail below). In a second step (i.e., a sensing UE report phase), the UEs may report sensing information (e.g., the environment representation) and RF information (e.g., the RF measurements 910) to an edge server (e.g., the network node 908). In a third step (i.e., a server aggregation phase), the edge server may aggregate reports (e.g., the first sensing report 914, the sensing reports 922, etc.) and construct (or update) an RF map (e.g., the RF map 916). In a fourth step (i.e., a requesting and use phase), the UEs (which may be connected to the edge server) may download and use the RF map to enhance their respective communication performance. For example, the UEs may use the RF map as part of a BM process.

Aspects pertaining to sensing UE reports (e.g., the first sensing report 914) are now described. A sensing UE (e.g., the first UE 902) may perform RF measurements (e.g., RSRP measurements of configured SSBs transmitted by a base station). In an example, the RF measurements may be or include the RF measurements 910. The sensing UE may build a local database of measured reference signals (e.g., measured SSBs) using various Rx beams. For instance, the sensing UE may log measurements associated with BPLs for all configured SSBs and all Rx beams, as well as respective timestamps associated with the measurements. In an example, the measurements may be logged in a form such as "RSRP (SSB, Rx beam)."

The sensing UE may use sensing information (i.e., sensor data) to construct a 3D representation (e.g., the environment representation 912) of an environment of the sensing UE. For instance, the sensing UE may identify physical surfaces (e.g., buildings) that are nearby the sensing UE. The physical surfaces may be potential RF signal reflectors.

The sensing UE may have local access to a structure of a beam codebook (i.e., a UE Rx beam codebook). For instance, the sensing UE may know pointing angles of Rx beams and/or beam patterns (e.g., child, parent, adjacent, etc.) of the Rx beams. A beam pattern may be a beamforming gain as a function of direction (i.e., azimuth and elevation).

The sensing UE may overlay the beam patterns on top of the sensing information to form an initial correlation between physical surfaces surrounding the sensing UE and received RF signals (e.g., received referenced signals), that is, the sensing UE may overlay the beam patterns on top of the environment representation 912. Overlaying the beam patterns in this manner may indicate a surface which is more likely to be associated with a suitable reflection (or a suitable refraction) of a reference signal received at the sensing UE. Overlaying the beam patterns in this manner may be referred to as generating a heat map.

The sensing UE may generate heat maps for multiple BPLs. The sensing UE may share (i.e., transmit) some or all of the heat maps with an edge server (e.g., the network node 908). In one example, the sensing UE may share heat maps with the edge server corresponding to a top k SSBs (ranked by RSRP measurements), where k is a positive integer. In another example, the sensing UE may share a linear combination of heat maps corresponding to different SSBs weighted by RSRP values (i.e., values corresponding to RSRP measurements) of respective SSBs. The sensing UE may also include a location of the sensing UE and/or an orientation of the sensing UE (e.g., the metadata 913) in a report (e.g., the first sensing report 914) to the edge server in order to aid the edge server in interpreting the report.

Aspects pertaining to server aggregation of sensing reports and RF map generation are now set forth. An edge server (e.g., the network node 908) may aggregate sensing reports (e.g., the first sensing report 914, the sensing reports 922, etc.) from different sensing UEs (e.g., the first UE 902, the UEs 924, etc.) and construct an RF map (e.g., the RF map 916) based on the aggregated sensing reports. The RF map may indicate a physical surface (i.e., the surface indication 918) that has been reported by multiple sensing UEs as being associated with bouncing suitable RF signals. The edge server may update the RF map according to reports received at a given refresh rate. For example, the edge server may update the RF map at a rate of x updates per second, where x is a positive integer. A UE (e.g., the first UE 902) connected to the edge server may request and/or download the RF map. The UE may use the RF map in order to assist in communication with a base station (e.g., the network node 908).

Figure 10:
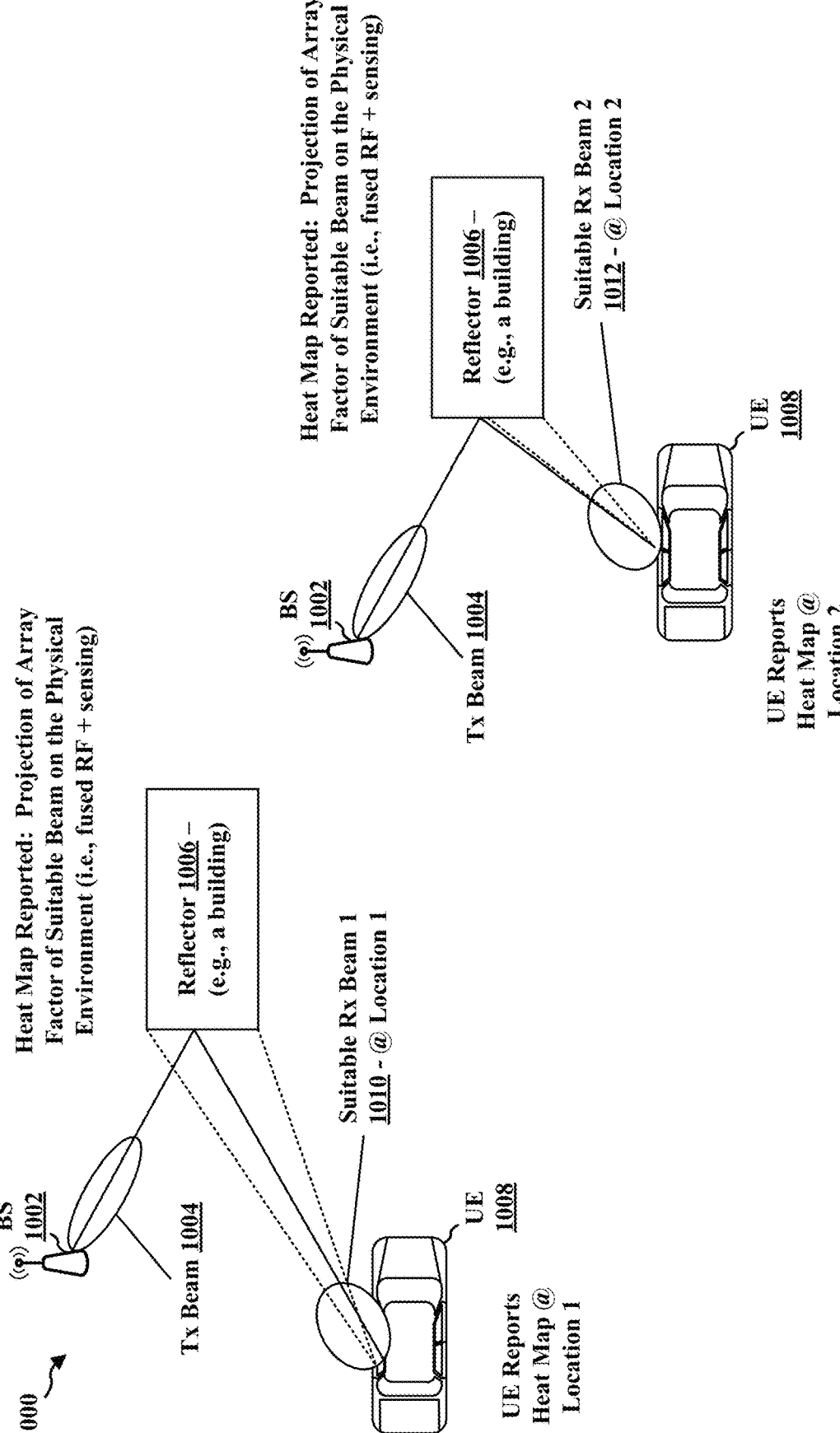
FIG. 10 is a diagram illustrating example aspects pertaining to heat map reporting.

FIG. 10 is a diagram 1000 illustrating example aspects pertaining to heat map reporting. As described above, RF information and sensing information may be used to report an (effective) physical environment of a UE that is associated with a beam being a suitable beam (e.g., a beam associated with a highest reference signal measurement) at a given location. In particular, a UE (i.e., a sensing UE) may overlay a beam pattern on top of an environment detected via sensors to correlate physical surfaces surrounding the UE with received RF signals in order to ascertain a surface that is likely to be associated with a suitable reflection received at the UE. Such a correlation may be referred to as a heat map, where the heat map may be a projection of an RF beam array factor on an actual physical environment of the UE. Stated differently, the heat map may include RF information and sensing information fused together. UEs may share heat maps with a network node (e.g., a base station, a server, an RSU, etc.) and the network node may generate an RF map which may be used by the UEs for communication.

In one example, a base station 1002 may transmit a reference signal via a Tx beam 1004, where the Tx beam 1004 may be reflected off of a reflector 1006 (e.g., a building). As described herein, a UE 1008 at a first location may report a heat map for the first location, where the heat map may be a projection of an array factor of a first suitable Rx beam 1010 on a physical environment of the UE 1008 (i.e., fused RF and sensing).

In another example, the base station 1002 may transmit the reference signal via the Tx beam 1004, where the Tx beam 1004 may be reflected off of the reflector 1006 (e.g., a building). As described herein, the UE 1008 at a second location may report a heat map for the second location, where the heat map may be a projection of an array factor of a second suitable Rx beam 1012 on a physical environment of the UE 1008 (i.e., fused RF and sensing).

The technologies described herein may be associated with various advantages over other RF map generation techniques. As the heat maps described herein project RF information (e.g., an array factor) on an actual environment of a UE, an RF map may be generated without dense sample information at different locations around the UE. Furthermore, as the heat maps described herein project the RF information (e.g., an array factor) on the actual environment of the UE, the RF map may be adapted to dynamic changes of the environment of the UE. For example, the RF map may suggest/indicate (based on aggregated heat maps) that a particular surface on a building is associated with a suitable Rx beam direction; however, a UE may utilize sensing (e.g., camera images) to infer that the particular surface is blocked for the UE. Thus, the UE may point an Rx beam in an alternate direction.

The technologies described herein may be advantageous for BM in an automotive setting. For instance, leveraging RF information and sensing information at a UE in order to prioritize a beam search by the UE in a given direction may result in increased performance at the UE. Furthermore, aggregating RF information and sensing information from multiple UEs in order to prioritize a beam search by the UE in a given direction may also result in increased performance at the UE. The increased performance may be observed in a tail of an RSRP distribution. For instance, the technologies described herein may be associated with gains when a reference signal is weak. This may be useful in vehicular applications that depend on a seamless connection without service interruption and/or buffering.

Figure 11:
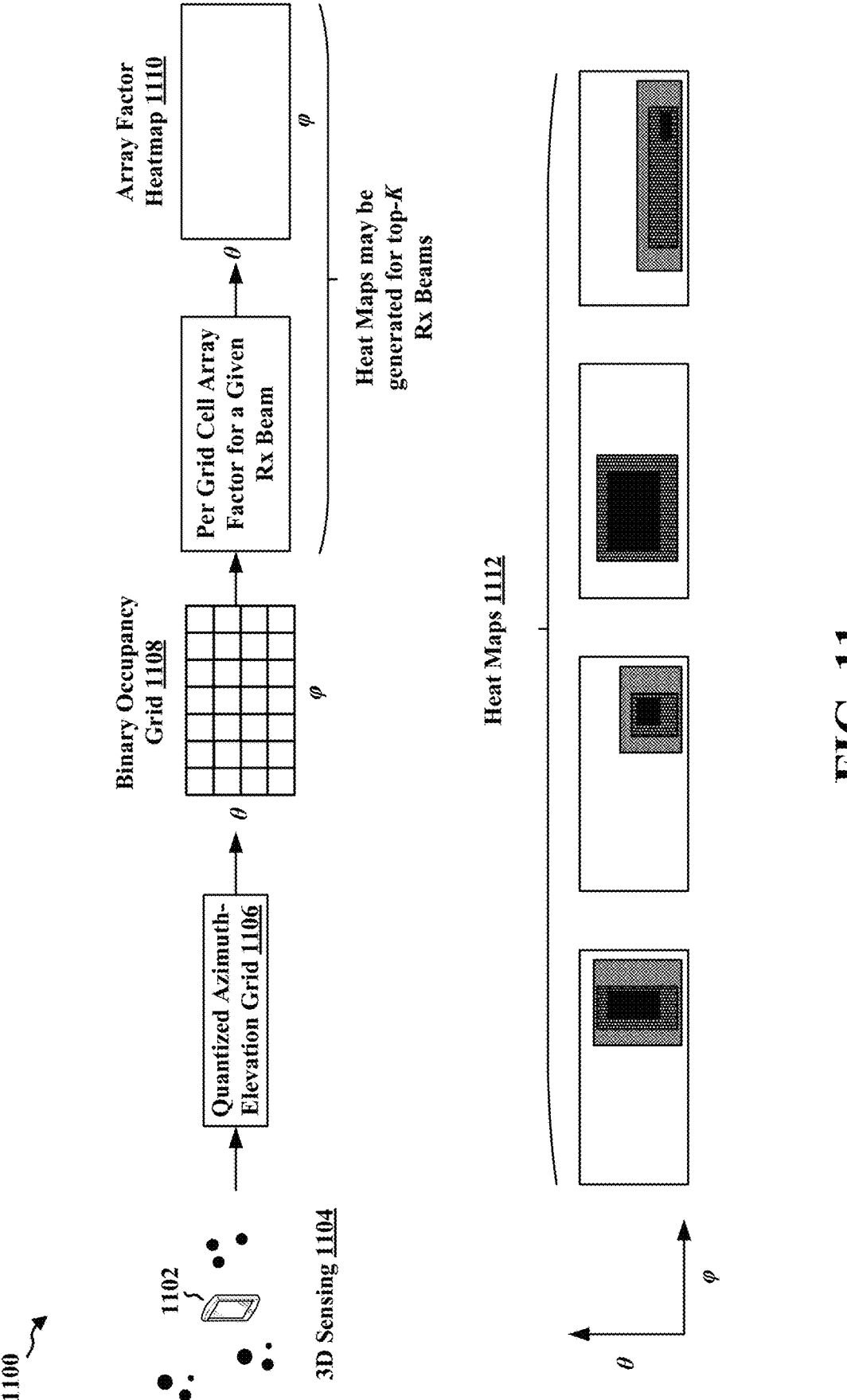
FIG. 11 is a diagram illustrating example aspects pertaining to heat map generation.

FIG. 11 is a diagram 1100 illustrating example aspects pertaining to heat map generation. A UE 1102 may perform 3D sensing 1104 via sensors of the UE 1102. In an example, the 3D sensing 1104 may be a 3D depth-sensing of an environment of the UE 1102. In an example, the 3D sensing 1104 may be a point cloud detection. In an example, the 3D sensing 1104 may be performed using a 360° camera view associated with a vehicle. The UE 1102 may generate a quantized azimuth-elevation grid 1106 based on the 3D sensing 1104. The UE 1102 may generate a binary occupancy grid 1108 based on the quantized azimuth-elevation grid 1106. In an example, the binary occupancy grid 1108 may include an azimuth and an elevation for each point in a point cloud. In an example, the UE 1102 may determine points associated with the binary occupancy grid 1108 that correspond to Rx beams. The UE 1102 may also determine a corresponding beamforming gain associated with each of the Rx beams. The UE 1102 may generate heat maps for top-K Rx beams, where K is a positive integer. The heat maps may include/be associated with an array factor heat map 1110. The array factor heat map 1110 may be for a particular Rx beam of the UE 1102. The array factor heat map 1110 may be for a grid cell array factor (associated with the binary occupancy grid 1108) for a given Rx beam. The diagram 1100 depicts heat maps 1112 that may be generated by a UE. A horizontal axis (e.g., an x-axis) associated with the heat maps 1112 may correspond to an azimuth (φ) and a vertical axis (e.g., a y-axis) associated with the heat maps 1112 may correspond to an elevation (θ).

FIG. 12 is a diagram 1200 illustrating an example of service discovery. The service discovery may correspond to/be associated with the discovery phase described above. Discovery may be performed via sidelink (SL) communications if a server is hosted at an RSU. Discovery may also be performed via a Uu interface if the server is hosted at a base station. SL discovery for BM may be performed on top of a proximity service layer (PC5). In one aspect, server to UE communication may be handled by a different application layer functionality. In a first example, UE and server discovery may occur as part of a PC5 discovery procedure where one or more information elements (IEs) are appended to a PC5 discovery message (1) to notify the UE (e.g., a sensing UE) of an availability of a BM service (i.e., a service that provides an RF map to a UE as described herein) or (2) to request access to the server by the UE. In a second example, discovery may be an application layer discovery on top of an existing PC5 connection or as a separate application layer operation.

In an example with respect to service discovery over SL, a cellular vehicle-to-everything (CV2X) application 1202 may transmit vehicle-to-everything (V2X) packets 1204 that may be received at a V2X layer 1206. A server control application 1208 may transmit server control packets 1210 that may be received at a server control layer 1212. PC5 quality of service (QOS) rules 1214 may be applied to the V2X packets 1204 and the server control packets 1210, where the PC5 QoS rules 1214 may include a packet filter set 1216. The V2X packets 1204 and the server control packets 1210 may be provided to an SDAP layer 1218. The V2X packets 1204 and the server control packets 1210 may be provided to a PDCP layer 1220, an RLC layer 1222, a MAC layer 1224, and/or a PHY layer 1226 in order to subscribe to the BM service. The PDCP layer 1220, the RLC layer 1222, the MAC layer 1224, and/or the PHY layer 1226 may be associated with an SL radio bearer 1228.

Figure 13:
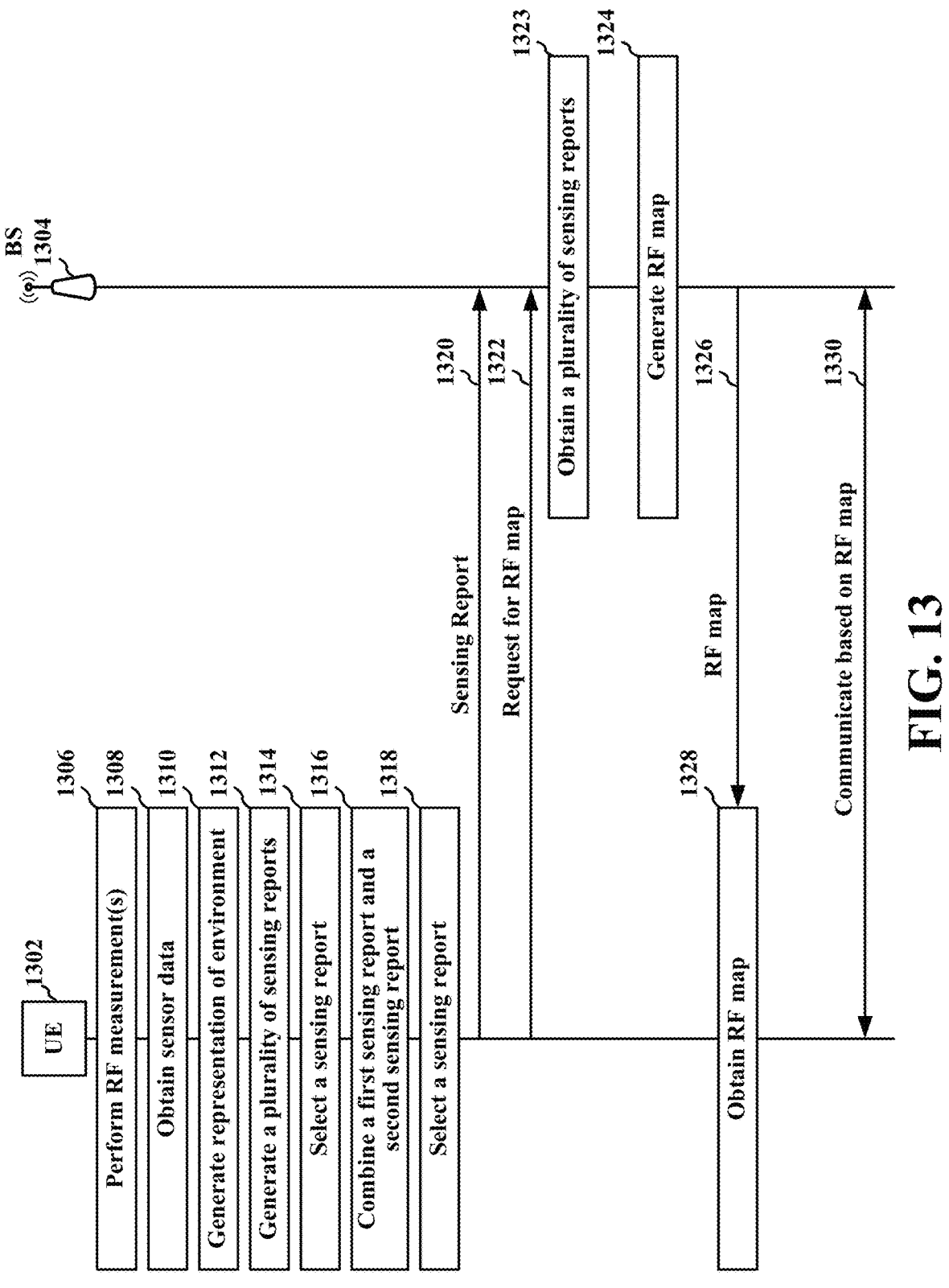
FIG. 13 is a communication flow diagram between a UE and a base station.

FIG. 13 is a communication flow diagram 1300 between a UE 1302 and a base station 1304. In an example, the UE 1302 may be or include the UE 104, the UE 350, the UE 402, the UEs 402, 404, 406, 408, the UE 604, the first UE 704, the second UE 706, the third UE 708, the first UE 808, the first UE 902, the UE 1008, the UE 1102, and/or the apparatus 1804. In an example, the base station 1304 may be or include the base station 102, the base station 310, the base station 602, the base station 702, the crowd-sourced edge server

710, the base station 802, the network node 908, and/or the base station 1002, the network entity 1802, and/or the network entity 1902.

At 1320, the UE 1302 may transmit a sensing report including (1) a first indication of at least one radio frequency (RF) measurement associated with at least one beam pair link (BPL) and (2) a second indication of a representation of an environment of the UE. At 1328, the UE 1302 may obtain an RF map based on the transmitted sensing report, where the RF map may be indicative of at least one surface in the environment of the UE that is associated with at least one suitable BPL. At 1330, the UE 1302 may communicate based on the RF map.

At 1312, the UE 1302 may generate a plurality of sensing reports including indications of RF measurements associated with beam pair links (BPLs) and the second indication of the representation of the environment of the UE, where the plurality of sensing reports may include the sensing report. At 1318, the UE 1302 may select the sensing report from amongst the plurality of sensing reports based on at least one of the indications of the RF measurements, where transmitting the sensing report at 1320 may include transmitting the sensing report based on the selection. In one aspect, the plurality of sensing reports may include a first sensing report and a second sensing report, and at 1316, the UE 1302 may combine the first sensing report and the second sensing report to generate the sensing report.

At 1306, the UE 1302 may perform the at least one RF measurement associated with the at least one BPL. At 1322, the UE 1302 may transmit a request for the RF map, where obtaining the RF map at 1328 may include obtaining the RF map based on the transmitted request. At 1308, the UE 1302 may obtain, via at least one sensor of the UE, sensor data. At 1310, the UE 1302 may generate, based on the sensor data, the representation of the environment of the UE.

At 1323, the base station 1304 may obtain a plurality of sensing reports for a plurality of user equipments (UEs), where a sensing report in the plurality of sensing reports may include (1) a first indication of at least one radio frequency (RF) measurement associated with at least one beam pair link (BPL) and (2) a second indication of a representation of an environment of a UE. At 1324, the base station 1304 may generate, based on the plurality of sensing reports, an RF map, where the RF map may be indicative of at least one surface in the environment of the UE that is associated with at least one suitable BPL. At 1326, the base station 1304 may transmit, for the UE, the RF map. At 1322, the base station 1304 may receive a request for the RF map, where transmitting the RF map at 1322 may include transmitting the RF map based on the received request.

FIG. 14 is a flowchart 1400 of a method of wireless communication. The method may be performed by a UE (e.g., the UE 104, the UE 350, the UE 402, the UEs 402, 404, 406, 408, the UE 604, the first UE 704, the second UE 706, the third UE 708, the first UE 808, the first UE 902, the UE 1008, the UE 1102, the UE 1302, and/or the apparatus 1804). The method may facilitate increased communications reliability at the UE. In an example, the method may be performed by the BM component 198.

At 1402, the UE transmits a sensing report including (1) a first indication of at least one radio frequency (RF) measurement associated with at least one beam pair link (BPL) and (2) a second indication of a representation of an environment of the UE. For example, FIG. 13 at 1320 shows that the UE 1302 may transmit a sensing report including (1) a first indication of at least one radio frequency (RF) measurement associated with at least one beam pair link (BPL) and (2) a second indication of a representation of an environment of the UE. In an example, the sensing report may be or include the first sensing report 914, the at least one RF measurement may be or include the RF measurements 910, and the representation of the environment of the UE may be or include the environment representation 912. In an example, the sensing report may be or include a heat map in the heat maps 1112. In an example, the at least one BPL may correspond to a link between an SSB Tx beam in the SSB Tx beams 606 and (1) an L1 UE Rx beam in the L1 UE Rx beams 610, (2) an L2 UE Rx beam in the L2 UE Rx beams 612, or (3) an L3 UE Rx beam in the L3 UE Rx beams 610. In another example, the at least one BPL may correspond to a link between the Tx beam 1004 and the first suitable Rx beam 1010 or a link between the Tx beam 1004 and the second suitable Rx beam 1012. In an example, 1402 may performed by the BM component 198.

At 1404, the UE obtains an RF map based on the transmitted sensing report, where the RF map is indicative of at least one surface in the environment of the UE that is associated with at least one suitable BPL. For example, FIG. 13 at 1328 shows that the UE 1302 may obtain an RF map based on the transmitted sensing report, where the RF map may be indicative of at least one surface in the environment of the UE that is associated with at least one suitable BPL. In an example, the RF map may be or include the RF map 916, the at least one surface in the environment may correspond to the surface indication 918, and the at least one suitable BPL may be or include the suitable BPL 920. In an example, 1404 may performed by the BM component 198.

At 1406, the UE communicates based on the RF map. For example, FIG. 13 at 1330 shows that the UE 1302 may communicate based on the RF map. In an example, 1406 may be performed by the BM component 198.

FIG. 15 is a flowchart 1500 of a method of wireless communication. The method may be performed by a UE (e.g., the UE 104, the UE 350, the UE 402, the UEs 402, 404, 406, 408, the UE 604, the first UE 704, the second UE 706, the third UE 708, the first UE 808, the first UE 902, the UE 1008, the UE 1102, the UE 1302, and/or the apparatus 1804). The method may facilitate increased communications reliability at the UE. In an example, the method (including the various aspects detailed below) may be performed by the BM component 198.

At 1514, the UE transmits a sensing report including (1) a first indication of at least one radio frequency (RF) measurement associated with at least one beam pair link (BPL) and (2) a second indication of a representation of an environment of the UE. For example, FIG. 13 at 1320 shows that the UE 1302 may transmit a sensing report including (1) a first indication of at least one radio frequency (RF) measurement associated with at least one beam pair link (BPL) and (2) a second indication of a representation of an environment of the UE. In an example, the sensing report may be or include the first sensing report 914, the at least one RF measurement may be or include the RF measurements 910, and the representation of the environment of the UE may be or include the environment representation 912. In an example, the sensing report may be or include a heat map in the heat maps 1112. In an example, the at least one BPL may correspond to a link between an SSB Tx beam in the SSB Tx beams 606 and (1) an L1 UE Rx beam in the L1 UE Rx beams 610, (2) an L2 UE Rx beam in the L2 UE Rx beams 612, or (3) an L3 UE Rx beam in the L3 UE Rx beams 610. In another example, the at least one BPL may correspond to a link between the Tx beam 1004 and the first suitable Rx beam 1010 or a link between the Tx beam 1004 and the second suitable Rx beam 1012. In an example, 1514 may performed by the BM component 198.

At 1518, the UE obtains an RF map based on the transmitted sensing report, where the RF map is indicative of at least one surface in the environment of the UE that is associated with at least one suitable BPL. For example, FIG. 13 at 1328 shows that the UE 1302 may obtain an RF map based on the transmitted sensing report, where the RF map may be indicative of at least one surface in the environment of the UE that is associated with at least one suitable BPL. For example, FIG. 13 at 1328 shows that the UE 1302 may obtain an RF map based on the transmitted sensing report, where the RF map may be indicative of at least one surface in the environment of the UE that is associated with at least one suitable BPL. In an example, the RF map may be or include the RF map 916, the at least one surface in the environment may correspond to the surface indication 918, and the at least one suitable BPL may be or include the suitable BPL 920. In an example, 1518 may performed by the BM component 198.

At 1520, the UE communicates based on the RF map. For example, FIG. 13 at 1330 shows that the UE 1302 may communicate based on the RF map. In an example, 1520 may be performed by the BM component 198.

In one aspect, communicating based on the RF map may include performing, based on the RF map, a beam search for at least one beam associated with the at least one suitable BPL. For example, performing the beam search may include aspects described above in connection with FIG. 6.

In one aspect, communicating based on the RF map may include communicating, via the at least one beam, based on the RF map. For example, communicating based on the RF map at 1330 may include communicating, via the at least one beam, based on the RF map.

In one aspect, the at least one beam may be associated with a reflection or a refraction off of the at least one surface in the environment. For example, the at least one surface may be or include the reflector 806 or the reflector 1006. Furthermore, FIG. 10 shows that that the Tx beam 1004 and the first suitable Rx beam 1010 may be associated with a reflection or a refraction.

In one aspect, communicating based on the RF map may include communicating with a network node based on the RF map. For example, communicating based on the RF map at 1330 may include communication with the base station 1304.

In one aspect, the sensing report may be a heat map that may include an indication of at least one beam pattern associated with the at least one BPL that may be overlaid upon the representation of the environment of the UE, and the RF map may be based on the heat map. For example, the sensing may report may be the first sensing report 914, and the first sensing report 914 may be a heat map that may include an indication of at least one beam pattern associated with the at least one BPL that may be overlaid upon the representation of the environment of the UE, and the RF map 916 may be based on the heat map.

In one aspect, at 1508, the UE may generate a plurality of sensing reports including indications of RF measurements associated with beam pair links (BPLs) and the second indication of the representation of the environment of the UE, where the plurality of sensing reports may include the sensing report. For example, FIG. 13 at 1312 shows that the UE 1302 may generate a plurality of sensing reports including indications of RF measurements associated with beam pair links (BPLs) and the second indication of the representation of the environment of the UE 1302, where the plurality of sensing reports may include the sensing report. In an example, plurality of sensing reports may include the first sensing report 914. In an example, 1508 may be performed by the BM component 198.

In one aspect, at 1510, the UE may select the sensing report from amongst the plurality of sensing reports based on at least one of the indications of the RF measurements, where transmitting the sensing report may include transmitting the sensing report based on the selection. For example, FIG. 13 at 1314 shows that the UE 1302 may select the sensing report from amongst the plurality of sensing reports based on at least one of the indications of the RF measurements, where transmitting the sensing report at 1320 may include transmitting the sensing report based on the selection. In an example, the UE may select the first sensing report 914. In an example, 1510 may be performed by the BM component 198.

In one aspect, the plurality of sensing reports may include a first sensing report and a second sensing report, and at 1512, the UE may combine the first sensing report and the second sensing report to generate the sensing report. For example, the plurality of sensing reports generated at 1312 may include a first sensing report and a second sensing report, and FIG. 13 at 1316 shows that the UE 1302 may combine the first sensing report and the second sensing report to generate the sensing report. In an example, the first sensing report 914 may be combined with a second sensing report to generate the sensing report. In an example, 1512 may be performed by the BM component 198.

In one aspect, at 1502, the UE may perform the at least one RF measurement associated with the at least one BPL. For example, FIG. 13 at 1306 shows that the UE 1302 may perform the at least one RF measurement associated with the at least one BPL. For example, the at least one RF measurement may be or include the RF measurements 910. In an example, 1502 may be performed by the BM component 198.

In one aspect, performing the at least one RF measurement associated with the at least one BPL may include performing at least one reference signal received power (RSRP) measurement on at least one synchronization signal block (SSB) associated with the at least one BPL. For example, performing the at least one RF measurement associated with the at least one BPL at 1306 may include performing at least one reference signal received power (RSRP) measurement on at least one synchronization signal block (SSB) associated with the at least one BPL.

In one aspect, the sensing report may further include at least one of a location of the UE or an orientation of the UE. For example, at least one of the location of the UE or the orientation of the UE may be included in the metadata 913 included in the first sensing report 914.

In one aspect, at 1516, the UE may transmit a request for the RF map, where obtaining the RF map may include obtaining the RF map based on the transmitted request. For example, FIG. 13 at 1322 shows that the UE 1302 may transmit a request for the RF map, where obtaining the RF map at 1328 may include obtaining the RF map based on the transmitted request. In an example, 1516 may be performed by the BM component 198.

In one aspect, at 1504, the UE may obtain, via at least one sensor of the UE, sensor data. For example, FIG. 13 at 1308 shows that the UE 1302 may obtain, via at least one sensor of the UE, sensor data. In an example, the at least one sensor may be or include the sensors 904. In an example, 1504 may be performed by the BM component 198.

In one aspect, at 1506, the UE may generate, based on the sensor data, the representation of the environment of the UE. For example, FIG. 13 at 1310 shows that the UE 1302 may generate, based on the sensor data, the representation of the environment of the UE. In an example, the representation of the environment may be the environment representation 912. In an example, 1506 may be performed by the BM component 198.

In one aspect, the sensor data may include at least one camera image. For example, the sensors 904 may include a camera that captures at least one camera image.

In one aspect, the RF map may be based on a plurality of sensing reports of a plurality of UEs that includes the UE. For example, the RF map 916 may be based on the first sensing report 914 and the sensing reports 922 and the plurality of UEs may be or include the UEs 924.

FIG. 16 is a flowchart 1600 of a method of wireless communication. The method may be performed by a network node (e.g., the base station 102, the base station 310, the base station 602, the base station 702, the crowd-sourced edge server 710, the base station 802, the network node 908, and/or the base station 1002, the network entity 1802, and/or the network entity 1902). The method may facilitate increased communications reliability at a UE. In an example, the method may be performed by the BM component 199.

At 1602, the network node obtains a plurality of sensing reports for a plurality of user equipments (UEs), where a sensing report in the plurality of sensing reports includes (1) a first indication of at least one radio frequency (RF) measurement associated with at least one beam pair link (BPL) and (2) a second indication of a representation of an environment of a UE. For example, FIG. 13 at 1323 shows that the base station 1304 obtains a plurality of sensing reports for a plurality of user equipments (UEs), where a sensing report in the plurality of sensing reports includes (1) a first indication of at least one radio frequency (RF) measurement associated with at least one beam pair link (BPL) and (2) a second indication of a representation of an environment of a UE (e.g., the UE 1302). In an example, the sensing report may be or include the first sensing report 914, the at least one RF measurement may be or include the RF measurements 910, and the representation of the environment of the UE may be or include the environment representation 912. In an example, the plurality of sensing reports may be or include the sensing reports 922 and the plurality of UEs may be or include the UEs 924. In an example, the sensing report may be or include a heat map in the heat maps 1112. In an example, the at least one BPL may correspond to a link between an SSB Tx beam in the SSB Tx beams 606 and (1) an L1 UE Rx beam in the L1 UE Rx beams 610, (2) an L2 UE Rx beam in the L2 UE Rx beams 612, or (3) an L3 UE Rx beam in the L3 UE Rx beams 610. In another example, the at least one BPL may correspond to a link between the Tx beam 1004 and the first suitable Rx beam 1010 or a link between the Tx beam 1004 and the second suitable Rx beam 1012. In an example, 1602 may performed by the BM component 199.

At 1604, the network node generates, based on the plurality of sensing reports, an RF map, where the RF map is indicative of at least one surface in the environment of the UE that is associated with at least one suitable BPL. For example, FIG. 13 at 1324 shows that the base station 1304 generates, based on the plurality of sensing reports, an RF map, where the RF map is indicative of at least one surface in the environment of the UE 1302 that is associated with at least one suitable BPL. In an example, the RF map may be or include the RF map 916, the at least one surface in the environment may correspond to the surface indication 918, and the at least one suitable BPL may be or include the suitable BPL 920. In an example, 1604 may performed by the BM component 199.

At 1606, the network node transmits, for the UE, the RF map. For example, FIG. 13 at 1326 shows that the base station 1304 transmits, for the UE 1302, the RF map. In an example, 1606 may be performed by the BM component 199.

FIG. 17 is a flowchart 1700 of a method of wireless communication. The method may be performed by a network node (e.g., the base station 102, the base station 310, the base station 602, the base station 702, the crowd-sourced edge server 710, the base station 802, the network node 908, and/or the base station 1002, the network entity 1802, and/or the network entity 1902). The method may facilitate increased communications reliability at the UE. In an example, the method (including the various aspects detailed below) may be performed by the BM component 199.

At 1702, the network node obtains a plurality of sensing reports for a plurality of user equipments (UEs), where a sensing report in the plurality of sensing reports includes (1) a first indication of at least one radio frequency (RF) measurement associated with at least one beam pair link (BPL) and (2) a second indication of a representation of an environment of a UE. For example, FIG. 13 at 1323 shows that the base station 1304 obtains a plurality of sensing reports for a plurality of user equipments (UEs), where a sensing report in the plurality of sensing reports includes (1) a first indication of at least one radio frequency (RF) measurement associated with at least one beam pair link (BPL) and (2) a second indication of a representation of an environment of a UE (e.g., the UE 1302). In an example, the sensing report may be or include the first sensing report 914, the at least one RF measurement may be or include the RF measurements 910, and the representation of the environment of the UE may be or include the environment representation 912. In an example, the plurality of sensing reports may be or include the sensing reports 922 and the plurality of UEs may be or include the UEs 924. In an example, the sensing report may be or include a heat map in the heat maps 1112. In an example, the at least one BPL may correspond to a link between an SSB Tx beam in the SSB Tx beams 606 and (1) an L1 UE Rx beam in the L1 UE Rx beams 610, (2) an L2 UE Rx beam in the L2 UE Rx beams 612, or (3) an L3 UE Rx beam in the L3 UE Rx beams 610. In another example, the at least one BPL may correspond to a link between the Tx beam 1004 and the first suitable Rx beam 1010 or a link between the Tx beam 1004 and the second suitable Rx beam 1012. In an example, 1702 may performed by the BM component 199.

At 1704, the network node generates, based on the plurality of sensing reports, an RF map, where the RF map is indicative of at least one surface in the environment of the UE that is associated with at least one suitable BPL. For example, FIG. 13 at 1324 shows that the base station 1304 generates, based on the plurality of sensing reports, an RF map, where the RF map is indicative of at least one surface in the environment of the UE 1302 that is associated with at least one suitable BPL. In an example, the RF map may be or include the RF map 916, the at least one surface in the environment may correspond to the surface indication 918, and the at least one suitable BPL may be or include the suitable BPL 920. In an example, 1704 may performed by the BM component 199.

At 1708, the network node transmits, for the UE, the RF map. For example, FIG. 13 at 1326 shows that the base station 1304 transmits, for the UE 1302, the RF map. In an example, 1708 may be performed by the BM component 199.

In one aspect, the network node may include a road side unit (RSU), a base station, or a server. For example, the network node may be the RSU 407, the base station 102, the base station 310, the base station 602, the base station 702, the crowd-sourced edge server 710, the base station 802, the base station 1002, or the base station 1304.

In one aspect, the at least one RF measurement associated with the at least one BPL may include at least one reference signal received power (RSRP) measurement. For example, the at least one RF measurement associated with the at least one BPL indicated in the sensing report obtained at 1320 may include at least one reference signal received power (RSRP) measurement.

In one aspect, the sensing report may be a heat map that may include an indication of at least one beam pattern associated with the at least one BPL that may be overlaid upon the representation of the environment of the UE. For example, the sensing report may be obtained at 1320 may be a heat map that may include an indication of at least one beam pattern associated with the at least one BPL that may be overlaid upon the representation of the environment of the UE. In another example, the sensing report may be a heat map in the heat maps 1112.

In one aspect, the sensing report may further include at least one of a location of the UE or an orientation of the UE. For example, the sensing report may include the metadata 913 and the metadata 913 may include at least one of a location of the UE or an orientation of the UE.

In one aspect, at 1706, the network node may receive a request for the RF map, where transmitting the RF map may include transmitting the RF map based on the received request. For example, FIG. 13 at 1322 shows that the base station 1304 may receive a request for the RF map, where transmitting the RF map at 1326 may include transmitting the RF map based on the received request. In an example, 1706 may be performed by the BM component 199.

Figure 18:
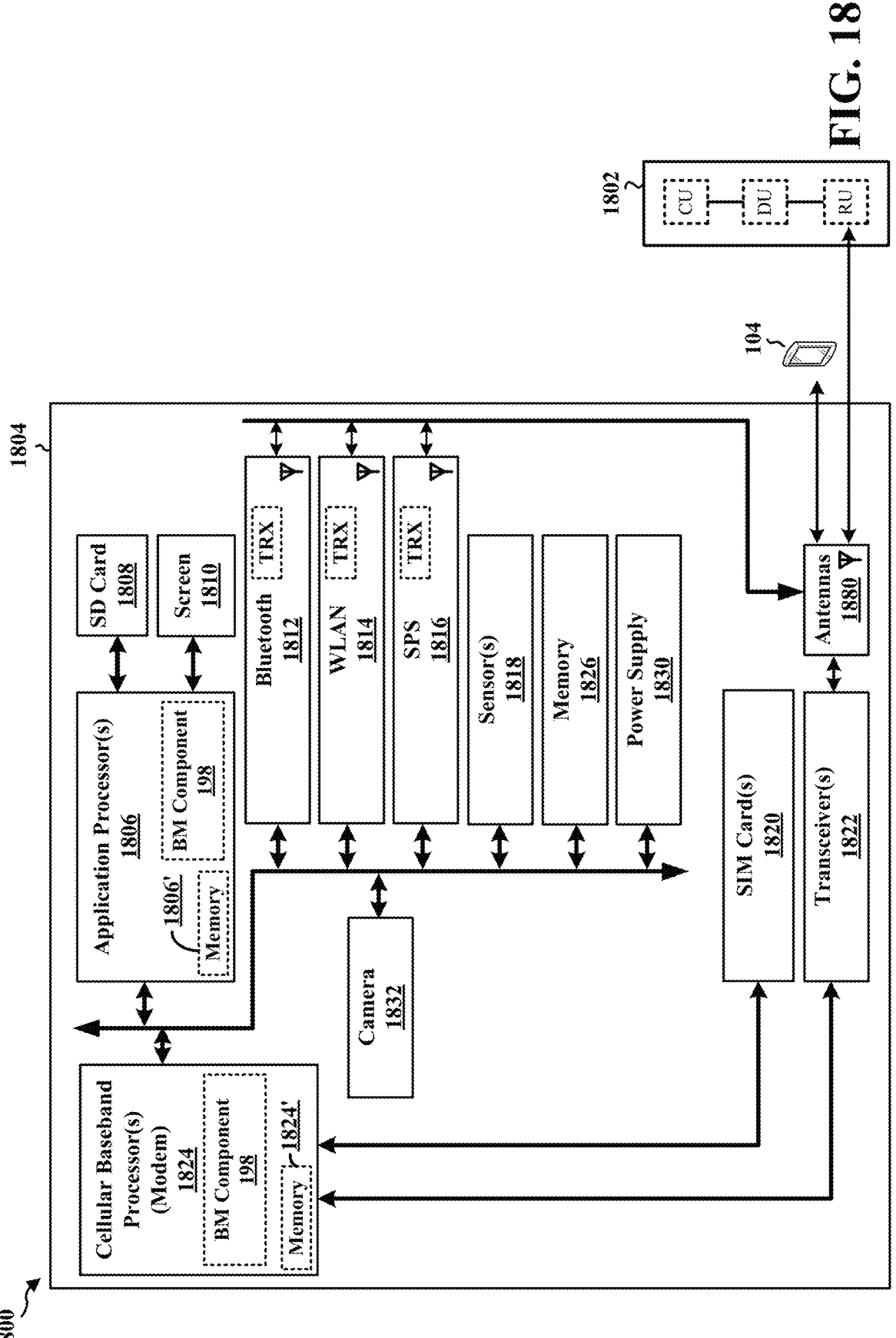
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include at least one cellular baseband processor 1824 (also referred to as a modem) coupled to one or more transceivers 1822 (e.g., cellular RF transceiver). The cellular baseband processor(s) 1824 may include at least one on-chip memory 1824'. In some aspects, the apparatus 1804 may further include one or more subscriber identity modules (SIM) cards 1820 and at least one application processor 1806 coupled to a secure digital (SD) card 1808 and a screen 1810. The application processor(s) 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor(s) 1824 communicates through the transceiver(s) 1822 via one or more antennas 1880 with the UE 104 and/or with an RU associated with a network entity 1802. The cellular baseband processor(s) 1824 and the application processor(s) 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor(s) 1824 and the application processor(s) 1806 are each responsible for general processing, including the execution of software stored on the computer-readable medium/memory. The software, when executed by the cellular baseband processor(s) 1824/application processor(s) 1806, causes the cellular baseband processor(s) 1824/application processor(s) 1806 to perform the various functions described supra. The computer-readable medium/memory may also be used for storing data that is manipulated by the cellular baseband processor(s) 1824/ application processor(s) 1806 when executing software. The cellular baseband processor(s) 1824/application processor (s) 1806 may be a component of the UE 350 and may include the at least one memory 360 and/or at least one of the TX processor 368, the RX processor 356, and the controller/ processor 359. In one configuration, the apparatus 1804 may be at least one processor chip (modem and/or application) and include just the cellular baseband processor(s) 1824 and/or the application processor(s) 1806, and in another configuration, the apparatus 1804 may be the entire UE (e.g., see UE 350 of FIG. 3) and include the additional modules of the apparatus 1804.

As discussed supra, the BM component 198 may be configured to transmit a sensing report including (1) a first indication of at least one radio frequency (RF) measurement associated with at least one beam pair link (BPL) and (2) a second indication of a representation of an environment of the UE. The BM component 198 may be configured to obtain an RF map based on the transmitted sensing report, where the RF map is indicative of at least one surface in the environment of the UE that is associated with at least one suitable BPL. The BM component 198 may be configured to communicate based on the RF map. The BM component 198 may be configured to generate a plurality of sensing reports including indications of RF measurements associated with beam pair links (BPLs) and the second indication of the representation of the environment of the UE, where the plurality of sensing reports includes the sensing report. The BM component 198 may be configured to select the sensing report from amongst the plurality of sensing reports based on at least one of the indications of the RF measurements, where transmitting the sensing report includes transmitting the sensing report based on the selection. The BM component 198 may be configured to combine the first sensing report and the second sensing report to generate the sensing report. The BM component 198 may be configured to perform the at least one RF measurement associated with the at least one BPL. The BM component 198 may be configured to transmit a request for the RF map, where obtaining the RF map includes obtaining the RF map based on the transmitted request. The BM component 198 may be configured to obtain, via at least one sensor of the UE, sensor data. The BM component 198 may be configured to generate, based on the sensor data, the representation of the environment of the UE. The BM component 198 may be within the cellular baseband processor(s) 1824, the application processor(s) 1806, or both the cellular baseband processor(s) 1824 and the application processor(s) 1806. The BM component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1804 may include a variety of components configured for various functions. In one configuration, the apparatus 1804, and in particular the cellular baseband processor(s) 1824 and/or the application processor(s) 1806, may include means for transmitting a sensing report including (1) a first indication of at least one radio frequency (RF) measurement associated with at least one beam pair link (BPL) and (2) a second indication of a representation of an environment of the UE. In one configuration, the apparatus 1804, and in particular the cellular baseband processor(s) 1824 and/or the application processor(s) 1806, may include means for obtaining an RF map based on the transmitted sensing report, where the RF map is indicative of at least one surface in the environment of the UE that is associated with at least one suitable BPL. In one configuration, the apparatus 1804, and in particular the cellular baseband processor(s) 1824 and/or the application processor(s) 1806, may include means for communicating based on the RF map. In one configuration, the apparatus 1804, and in particular the cellular baseband processor(s) 1824 and/or the application processor(s) 1806, may include means for generating a plurality of sensing reports including indications of RF measurements associated with beam pair links (BPLs) and the second indication of the representation of the environment of the UE, where the plurality of sensing reports includes the sensing report. In one configuration, the apparatus 1804, and in particular the cellular baseband processor(s) 1824 and/or the application processor(s) 1806, may include means for selecting the sensing report from amongst the plurality of sensing reports based on at least one of the indications of the RF measurements, where transmitting the sensing report includes transmitting the sensing report based on the selection. In one configuration, the apparatus 1804, and in particular the cellular baseband processor(s) 1824 and/or the application processor(s) 1806, may include means for combining the first sensing report and the second sensing report to generate the sensing report. In one configuration, the apparatus 1804, and in particular the cellular baseband processor(s) 1824 and/or the application processor(s) 1806, may include means for performing the at least one RF measurement associated with the at least one BPL. In one configuration, the apparatus 1804, and in particular the cellular baseband processor(s) 1824 and/or the application processor(s) 1806, may include means for transmitting a request for the RF map, where obtaining the RF map includes obtaining the RF map based on the transmitted request. In one configuration, the apparatus 1804, and in particular the cellular baseband processor (s) 1824 and/or the application processor(s) 1806, may include means for obtaining, via at least one sensor of the UE, sensor data. In one configuration, the apparatus 1804, and in particular the cellular baseband processor(s) 1824 and/or the application processor(s) 1806, may include means for generating, based on the sensor data, the representation of the environment of the UE. The means may be the BM component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 19:
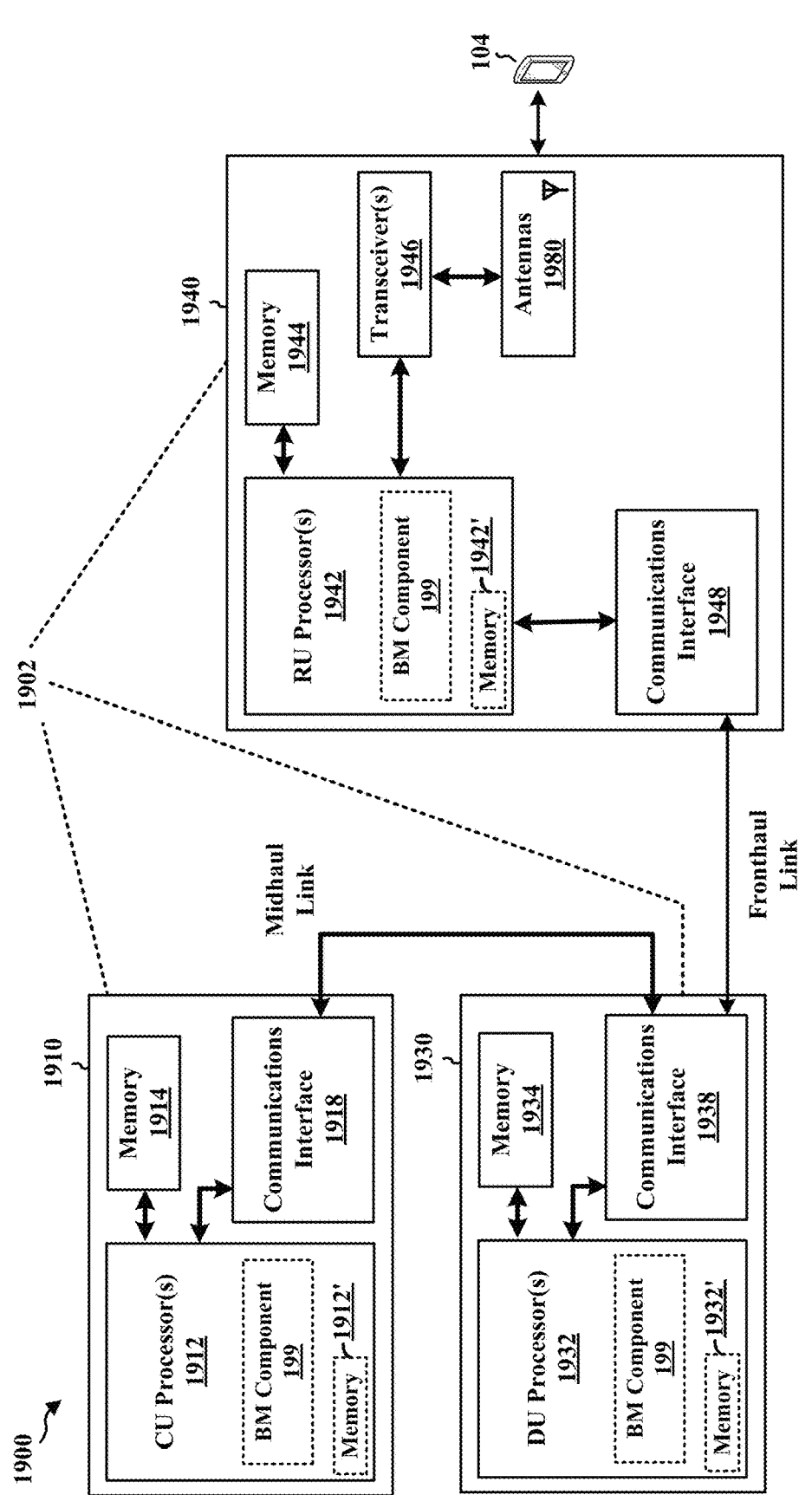
FIG. 19 is a diagram illustrating an example of a hardware implementation for an example network entity.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the BM component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include at least one CU processor 1912. The CU processor(s) 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include at least one DU processor 1932. The DU processor(s) 1932 may include on-chip memory 1932'. In some aspects, the DU 1930 may further include additional memory modules 1934 and a communications interface 1938. The DU 1930 communicates with the RU 1940 through a fronthaul link. The RU 1940 may include at least one RU processor 1942. The RU processor(s) 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912', 1932', 1942' and the additional memory modules 1914, 1934, 1944 may each be considered a computer-readable medium/memory. Each computer-readable medium/memory may be non-transitory. Each of the processors 1912, 1932, 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the BM component 199 may be configured to obtain a plurality of sensing reports for a plurality of user equipments (UEs), where a sensing report in the plurality of sensing reports includes (1) a first indication of at least one radio frequency (RF) measurement associated with at least one beam pair link (BPL) and (2) a second indication of a representation of an environment of a UE. The BM component 199 may be configured to generate, based on the plurality of sensing reports, an RF map, where the RF map is indicative of at least one surface in the environment of the UE that is associated with at least one suitable BPL. The BM component 199 may be configured to transmit, for the UE, the RF map. The BM component 199 may be configured to receive a request for the RF map, where transmitting the RF map includes transmitting the RF map based on the received request. The BM component 199 may be within one or more processors of one or more of the CU 1910, DU 1930, and the RU 1940. The BM component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1902 may include a variety of components configured for various functions. In one configuration, the network entity 1902 may include means for obtaining a plurality of sensing reports for a plurality of user equipments (UEs), where a sensing report in the plurality of sensing reports includes (1) a first indication of at least one radio frequency (RF) measurement associated with at least one beam pair link (BPL) and (2) a second indication of a representation of an environment of a UE. In one configuration, the network entity 1902 may include means for generating, based on the plurality of sensing reports, an RF map, where the RF map is indicative of at least one surface in the environment of the UE that is associated with at least one suitable BPL. In one configuration, the network entity 1902 may include means for transmitting, for the UE, the RF map. In one configuration, the network entity 1902 may include means for receiving a request for the RF map, where transmitting the RF map includes transmitting the RF map based on the received request. The means may be the BM component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

Some wireless communication systems (e.g., 5G NR) may utilize beam management (BM) in order to optimize communications between a user equipment (UE) and a base station. BM may refer to a process of determining a transmit (Tx) and receive (Rx) beam alignment that achieves a suitable Tx-Rx communication quality. A base station may generate an RF map based on measurements from multiple UEs at different locations in an environment in order to facilitate UE BM. The RF map may indicate beam directions and/or beam widths that were suitable for the multiple UEs in the environment for communicating with a base station. However, a quality of the RF map may depend on aggregating measurements from multiple densely located UEs over different locations and/or orientations. Furthermore, dynamic changes in the environment may impact the quality of the RF map as well, that is, RF measurements performed in a dynamically changing environment may result in an RF map with a diminished quality. Additionally, a quality of the RF map may depend on a spatial sampling factor used by a UE for RF measurements.

Various technologies pertaining to RF map construction at an edge server via aggregation of multiple sensing UE reports is described herein. In an example, a UE transmits a sensing report including (1) a first indication of at least one radio frequency (RF) measurement associated with at least one beam pair link (BPL) and (2) a second indication of a representation of an environment of the UE. The UE obtains an RF map based on the transmitted sensing report, where the RF map is indicative of at least one surface in the environment of the UE that is associated with at least one suitable BPL. The UE communicates based on the RF map. Vis-à-vis transmitting the sensing report and communicating based on the (obtained) RF map, the UE may communicate with a base station with improved reliability. Furthermore, as the sensing report includes a first indication of at least one RF measurement and a second indication of a representation of the environment of the UE, the RF map may be obtained by the UE without utilizing dense sampling information at different locations around the UE. Furthermore, as the sensing report includes the first indication of the at least one RF measurement and the second indication of the representation of the environment of the UE, the RF map may be adaptable to dynamic environment changes of the UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: transmitting a sensing report including (1) a first indication of at least one radio frequency (RF) measurement associated with at least one beam pair link (BPL) and (2) a second indication of a representation of an environment of the UE; obtaining an RF map based on the transmitted sensing report, wherein the RF map is indicative of at least one surface in the environment of the UE that is associated with at least one suitable BPL; and communicating based on the RF map.

Aspect 2 is the method of aspect 1, wherein communicating based on the RF map includes: performing, based on the RF map, a beam search for at least one beam associated with the at least one suitable BPL; and communicating, via the at least one beam, based on the RF map.

Aspect 3 is the method of aspect 2, wherein the at least one beam is associated with a reflection or a refraction off of the at least one surface in the environment.

Aspect 4 is the method of any of aspects 1-3, wherein communicating based on the RF map includes communicating with a network node based on the RF map.

Aspect 5 is the method of any of aspects 1-4, wherein the sensing report is a heat map that includes an indication of at least one beam pattern associated with the at least one BPL that is overlaid upon the representation of the environment of the UE, and wherein the RF map is based on the heat map.

Aspect 6 is the method of any of aspects 1-5, further including: generating a plurality of sensing reports including indications of RF measurements associated with beam pair links (BPLs) and the second indication of the representation of the environment of the UE, wherein the plurality of sensing reports includes the sensing report.

Aspect 7 is the method of aspect 6, further including: selecting the sensing report from amongst the plurality of sensing reports based on at least one of the indications of the RF measurements, wherein transmitting the sensing report includes transmitting the sensing report based on the selection.

Aspect 8 is the method of any of aspects 6-7, wherein the plurality of sensing reports includes a first sensing report and a second sensing report, the method further including:

combining the first sensing report and the second sensing report to generate the sensing report.

Aspect 9 is the method of any of aspects 1-8, further including: performing at least one RF measurement associated with the at least one BPL.

Aspect 10 is the method of aspect 9, wherein performing the at least one RF measurement associated with the at least one BPL includes performing at least one reference signal received power (RSRP) measurement on at least one synchronization signal block (SSB) associated with the at least one BPL.

Aspect 11 is the method of any of aspects 1-10, wherein the sensing report further includes at least one of a location of the UE or an orientation of the UE.

Aspect 12 is the method of any of aspects 1-11, further including: transmitting a request for the RF map, wherein obtaining the RF map includes obtaining the RF map based on the transmitted request.

Aspect 13 is the method of any of aspects 1-12, further including: obtaining, via at least one sensor of the UE, sensor data; and generating, based on the sensor data, the representation of the environment of the UE.

Aspect 14 is the method of aspect 13, wherein the sensor data includes at least one camera image.

Aspect 15 is the method of any of aspects 1-14, wherein the RF map is based on a plurality of sensing reports of a plurality of UEs that includes the UE.

Aspect 16 is an apparatus for wireless communication at a user equipment (UE) comprising at least one memory and at least one processor coupled to the at least one memory and, based at least in part on information stored in the at least one memory, the at least one processor, individually or in any combination, is configured to implement a method as in any of aspects 1-15.

Aspect 17 is the apparatus of aspect 16, further comprising at least one of a transceiver or an antenna coupled to the at least one processor, wherein to communicate based on the RF map, the at least one processor, individually or in any combination is configured to communicate based on the RF map via at least one of the transceiver or the antenna.

Aspect 18 is an apparatus for wireless communication, further comprising means for performing a method as in any of aspects 1-15.

Aspect 19 is a computer-readable medium (e.g., a non-transitory computer-readable medium) storing computer executable code, the computer executable code, when executed by at least one processor, causes the at least one processor to implement a method as in any of aspects 1-15.

Aspect 20 is a method of wireless communication at a network node, including: obtaining a plurality of sensing reports for a plurality of user equipments (UEs), wherein a sensing report in the plurality of sensing reports includes (1) a first indication of at least one radio frequency (RF) measurement associated with at least one beam pair link (BPL) and (2) a second indication of a representation of an environment of a UE; generating, based on the plurality of sensing reports, an RF map, wherein the RF map is indicative of at least one surface in the environment of the UE that is associated with at least one suitable BPL; and transmitting, for the UE, the RF map.

Aspect 21 is the method of aspect 20, wherein the network node includes a road side unit (RSU), a base station, or a server.

Aspect 22 is the method of any of aspects 20-21, wherein the at least one RF measurement associated with the at least one BPL includes at least one reference signal received power (RSRP) measurement.

Aspect 23 is the method of any of aspects 20-22, wherein the sensing report is a heat map that includes an indication of at least one beam pattern associated with the at least one BPL that is overlaid upon the representation of the environment of the UE.

Aspect 24 is the method of any of aspects 20-23, wherein the sensing report further includes at least one of a location of the UE or an orientation of the UE.

Aspect 25 is the method of any of aspects 20-24, further including: receiving a request for the RF map, wherein transmitting the RF map includes transmitting the RF map based on the received request.

Aspect 26 is an apparatus for wireless communication at a network node comprising at least one memory and at least one processor coupled to the at least one memory and, based at least in part on information stored in the at least one memory, the at least one processor, individually or in any combination, is configured to implement a method as in any of aspects 20-25.

Aspect 27 is the apparatus of aspect 26, further comprising at least one of a transceiver or an antenna coupled to the at least one processor, wherein to transmit the RF map, the at least one processor, individually or in any combination is configured to transmit the RF map via at least one of the transceiver or the antenna.

Aspect 28 is an apparatus for wireless communication, further comprising means for performing a method as in any of aspects 20-25.

Aspect 29 is a computer-readable medium (e.g., a non-transitory computer-readable medium) storing computer executable code, the computer executable code, when executed by at least one processor, causes the at least one processor to implement a method as in any of aspects 20-25.

What is claimed is:

1. An apparatus for wireless communication at a user equipment (UE), comprising:

at least one memory; and at least one processor coupled to the at least one memory and, based at least in part on information stored in the at least one memory, the at least one processor is configured to:

obtain, via at least one sensor of the UE, sensor data;

transmit a sensing report including (1) a first indication of at least one radio frequency (RF) measurement associated with at least one beam pair link (BPL) and (2) a second indication of a representation of an environment of the UE, wherein the representation of the environment of the UE is based on the sensor data;

obtain an RF map based on the transmitted sensing report, wherein the RF map is indicative of at least one surface in the environment of the UE that is associated with at least one suitable BPL; and communicate based on the RF map.

2. The apparatus of claim 1, wherein to communicate based on the RF map, the at least one processor is configured to:

perform, based on the RF map, a beam search for at least one beam associated with the at least one suitable BPL; and communicate, via the at least one beam, based on the RF map.

3. The apparatus of claim 2, wherein the at least one beam is associated with a reflection or a refraction off of the at least one surface in the environment.

4. The apparatus of claim 1, wherein to communicate based on the RF map, the at least one processor is configured to communicate with a network node based on the RF map.

5. The apparatus of claim 1, wherein the sensing report is a heat map that includes an indication of at least one beam pattern associated with the at least one BPL that is overlaid upon the representation of the environment of the UE, and wherein the RF map is based on the heat map.

6. The apparatus of claim 1, wherein the at least one processor is further configured to:

generate a plurality of sensing reports including indications of RF measurements associated with beam pair links (BPLs) and the second indication of the representation of the environment of the UE, wherein the plurality of sensing reports includes the sensing report.

7. The apparatus of claim 6, wherein the at least one processor is further configured to:

select the sensing report from amongst the plurality of sensing reports based on at least one of the indications of the RF measurements, wherein to transmit the sensing report, the at least one processor is configured to transmit the sensing report based on the selection.

8. The apparatus of claim 6, wherein the plurality of sensing reports includes a first sensing report and a second sensing report, and wherein the at least one processor is further configured to:

combine the first sensing report and the second sensing report to generate the sensing report.

9. The apparatus of claim 1, wherein the at least one processor is further configured to:

perform the at least one RF measurement associated with the at least one BPL.

10. The apparatus of claim 9, wherein to perform the at least one RF measurement associated with the at least one BPL, the at least one processor is configured to perform at least one reference signal received power (RSRP) measurement on at least one synchronization signal block (SSB) associated with the at least one BPL.

11. The apparatus of claim 1, wherein the sensing report further includes at least one of a location of the UE or an orientation of the UE.

12. The apparatus of claim 1, wherein the at least one processor is further configured to:

transmit a request for the RF map, wherein to obtain the RF map, the at least one processor is configured to obtain the RF map based on the transmitted request.

13. The apparatus of claim 1, wherein the at least one processor is further configured to:

generate, based on the sensor data, the representation of the environment of the UE.

14. The apparatus of claim 13, wherein the sensor data comprises at least one camera image.

15. The apparatus of claim 1, wherein the RF map is based on a plurality of sensing reports of a plurality of UEs that includes the UE.

16. The apparatus of claim 1, further comprising at least one of a transceiver or an antenna coupled to the at least one processor, wherein to communicate based on the RF map, the at least one processor is configured to communicate based on the RF map via at least one of the transceiver or the antenna.

17. An apparatus for wireless communication at a network node, comprising:

at least one memory; and at least one processor coupled to the at least one memory and, based at least in part on information stored in the at least one memory, the at least one processor is configured to:

obtain a plurality of sensing reports for a plurality of user equipments (UEs), wherein a sensing report in the plurality of sensing reports includes (1) a first indication of at least one radio frequency (RF) measurement associated with at least one beam pair link (BPL) and (2) a second indication of a representation of an environment of a UE, wherein the representation of the environment of the UE is based on sensor data;

generate, based on the plurality of sensing reports, an RF map, wherein the RF map is indicative of at least one surface in the environment of the UE that is associated with at least one suitable BPL; and transmit, for the UE, the RF map.

18. The apparatus of claim 17, wherein the network node comprises a road side unit (RSU), a base station, or a server.

19. The apparatus of claim 17, wherein the at least one RF measurement associated with the at least one BPL comprises at least one reference signal received power (RSRP) measurement.

20. The apparatus of claim 17, wherein the sensing report is a heat map that includes an indication of at least one beam pattern associated with the at least one BPL that is overlaid upon the representation of the environment of the UE.

21. The apparatus of claim 17, wherein the sensing report further includes at least one of a location of the UE or an orientation of the UE.

22. The apparatus of claim 17, wherein the at least one processor is further configured to:

receive a request for the RF map, wherein to transmit the RF map, the at least one processor is configured to transmit the RF map based on the received request.

23. The apparatus of claim 17, further comprising at least one of a transceiver or an antenna coupled to the at least one processor, wherein to transmit the RF map, the at least one processor is configured to transmit the RF map via at least one of the transceiver or the antenna.

24. A method of wireless communication at a user equipment (UE), comprising:

obtaining, via at least one sensor of the UE, sensor data;

transmitting a sensing report including (1) a first indication of at least one radio frequency (RF) measurement associated with at least one beam pair link (BPL) and (2) a second indication of a representation of an environment of the UE, wherein the representation of the environment of the UE is based on the sensor data;

obtaining an RF map based on the transmitted sensing report, wherein the RF map is indicative of at least one surface in the environment of the UE that is associated with at least one suitable BPL; and communicating based on the RF map.

25. The method of claim 24, wherein communicating based on the RF map comprises:

performing, based on the RF map, a beam search for at least one beam associated with the at least one suitable BPL; and communicating, via the at least one beam, based on the RF map.

26. The method of claim 25, wherein the at least one beam is associated with a reflection or a refraction off of the at least one surface in the environment.

27. The method of claim 24, wherein communicating based on the RF map comprises communicating with a network node based on the RF map.

28. The method of claim 24, wherein the sensing report is a heat map that includes an indication of at least one beam pattern associated with the at least one BPL that is overlaid upon the representation of the environment of the UE, and wherein the RF map is based on the heat map.

29. The method of claim 24, further comprising:

generating a plurality of sensing reports including indications of RF measurements associated with beam pair links (BPLs) and the second indication of the representation of the environment of the UE, wherein the plurality of sensing reports includes the sensing report.

30. A method of wireless communication at a network node, comprising:

obtaining a plurality of sensing reports for a plurality of user equipments (UEs), wherein a sensing report in the plurality of sensing reports includes (1) a first indication of at least one radio frequency (RF) measurement associated with at least one beam pair link (BPL) and (2) a second indication of a representation of an environment of a UE, wherein the representation of the environment of the UE is based on sensor data;

generating, based on the plurality of sensing reports, an RF map, wherein the RF map is indicative of at least one surface in the environment of the UE that is associated with at least one suitable BPL; and transmitting, for the UE, the RF map.

\* \* \* \* \*